(12) United States Patent
Tsutsumi

(10) Patent No.: US 8,937,662 B2
(45) Date of Patent: Jan. 20, 2015

(54) IMAGE PROCESSING DEVICE, IMAGE PROCESSING METHOD, AND PROGRAM

(71) Applicant: Canon Kabushiki Kaisha, Tokyo (JP)

(72) Inventor: Shohei Tsutsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/778,355

(22) Filed: Feb. 27, 2013

(65) Prior Publication Data

US 2013/0229532 A1    Sep. 5, 2013

(30) Foreign Application Priority Data

Mar. 1, 2012    (JP) ................... 2012-045627

(51) Int. Cl.
*H04N 17/00* (2006.01)
*H04N 17/02* (2006.01)
*H04N 5/232* (2006.01)
*G03B 13/00* (2006.01)

(52) U.S. Cl.
CPC ............. *H04N 17/002* (2013.01); *H04N 5/232* (2013.01)
USPC ............ 348/187; 348/349; 348/345; 348/343

(58) Field of Classification Search
USPC .................. 348/187, 188, 345, 349, 340, 343
See application file for complete search history.

(56) References Cited

U.S. PATENT DOCUMENTS

| 2007/0252074 | A1* | 11/2007 | Ng et al. | 250/208.1 |
| 2009/0140131 | A1* | 6/2009 | Utagawa | 250/226 |
| 2010/0265381 | A1* | 10/2010 | Yamamoto et al. | 348/335 |
| 2010/0265385 | A1* | 10/2010 | Knight et al. | 348/340 |
| 2011/0019184 | A1 | 1/2011 | Iwane | |
| 2012/0236168 | A1 | 9/2012 | Tsutsumi | |
| 2013/0038723 | A1 | 2/2013 | Tsutsumi | |

FOREIGN PATENT DOCUMENTS

| EP | 2180362 A1 | 4/2010 |
| JP | 2003-141529 A | 5/2003 |
| JP | 2009-124213 A | 6/2009 |
| WO | 2008/050904 A1 | 5/2008 |

OTHER PUBLICATIONS

Japanese Amendment (JP-A5-2009-124213) in Japanese Patent Application 2009-124213, as published on May 13, 2010.
Jan. 7, 2014 extended European Search Report for counterpart Application No. 13156808.1.

* cited by examiner

*Primary Examiner* — Michael Lee
(74) *Attorney, Agent, or Firm* — Fitzpatrick, Cella, Harper & Scinto

(57) ABSTRACT

By a conventional technique, it is not possible to provide an image refocused accurately at a desired subject distance. An image processing device is characterized by including an image data acquiring unit configured to acquire calibration image data obtained by an image capturing device including an aperture to adjust an amount of incident light, a lens array in which a plurality of lenses is arranged, and an image sensing element to photoelectrically convert an image of a subject via the lens array and obtained in a state where the aperture is stopped down in accordance with an instruction of calibration; and a unit configured to acquire a position of an image on the image sensing element corresponding to each of the lenses based on the calibration image data.

13 Claims, 28 Drawing Sheets

CAPTURED IMAGE WHEN APERTURE IS FULLY OPENED (F2.8)

ENLARGED VIEW OF
UPPER-LEFT END PART

ENLARGED VIEW OF CENTER PART

CAPTURED IMAGE WHEN APERTURE IS STOPPED DOWN(F11)

ENLARGED VIEW OF
UPPER-LEFT END PART

ENLARGED VIEW OF CENTER PART

| NUMBER OF MICROLENS | GRAVITY CENTER POSITION OF IMAGE ON SENSOR BASED ON CAPTURED IMAGE DATA (Cx(m,n), Cy(m,n)) | GRAVITY CENTER POSITION OF IMAGE ON SENSOR BASED ON DESIGN VALUE (Cx_s(m,n), Cy_s(m,n)) | OPTICAL CENTER POSITION BASED ON DESIGN VALUE (Ox_s(m,n), Oy_s(m,n)) | AMOUNT OF DEVIATION OF GRAVITY CENTER POSITION (Sx(m,n), Sy(m,n)) | ACTUAL OPTICAL CENTER POSITION (Ox(m,n), Oy(m,n)) |
|---|---|---|---|---|---|
| ... | ... | ... | ... | ... | ... |
| (5, 5) | (128.2, 128.2) | (128.0, 128.0) | (130, 130) | (-1.0, -4.4) | (129.0, 125.6) |
| (5, 6) | (129.3, 256.2) | (129.0, 256.0) | (130, 258) | (-0.5, -4.4) | (129.5, 253.6) |
| (5, 7) | (130.4, 384.2) | (130.0, 384.0) | (130, 386) | (0.0, -4.3) | (130.0, 381.7) |
| (5, 8) | (131.5, 512.2) | (131.0, 512.0) | (130, 514) | (0.5, -4.3) | (130.5, 509.7) |
| (5, 9) | (132.6, 640.2) | (132.0, 640.0) | (130, 642) | (1.0, -4.2) | (131.0, 637.8) |
| (5, 10) | (133.1, 768.2) | (133.0, 768.0) | (130, 770) | (1.5, -4.2) | (131.5, 765.8) |
| ... | ... | ... | ... | ... | ... |

FIG.15

| PIXEL POSITION OF COMBINED IMAGE | KIND OF COLOR | PIXEL VALUE |
|---|---|---|
| ⋮ | ⋮ | ⋮ |
| (10,9) | B | 21 |
| (10,10) | R | 24 |
| (10,10) | R | 26 |
| (10,10) | G | 32 |
| (10,10) | G | 34 |
| (10,10) | B | 22 |
| (10,11) | R | 25 |
| ⋮ | ⋮ | ⋮ |

1901: rows (10,10) R 24 and (10,10) R 26
1902: rows (10,10) G 32 and (10,10) G 34
1903: row (10,10) B 22

FIG.19

IMAGE PROCESSING DEVICE, IMAGE PROCESSING METHOD, AND PROGRAM

BACKGROUND OF THE INVENTION

1. Field of the Invention

The present invention relates to calibration of a microlens array.

2. Description of the Related Art

Conventionally, when an image was captured by a camera was out of focus, it was necessary to recapture the image after re-performing focusing. Further, when obtaining focused images of a plurality of subjects at different depths, it was necessary to re-focus before capturing the image of each subject in focus.

In recent years, a technique called light field photography has been developed, which is capable of acquiring images from multiple viewpoints by adding a new optical element into the optical system, and by adjusting the focus position in later image processing (refocus).

By using this technique, there is an advantage that a failure in focusing at the time of image capture can be compensated for by image processing because it is possible to perform focusing after image capturing. Further, there is also an advantage that it is possible to obtain a plurality of images focused on arbitrary subjects in an image from one captured image by changing the image processing method, and therefore, it is possible to reduce the number of times images are captured.

In light field photography, the direction and intensity of a light beam that passes through each position or light field, (hereinafter, referred to as "LF") in a plurality of positions in the space are calculated from multi-viewpoint image data. Then an image is captured, by using the information of the obtained LF, on the assumption that light passes through a virtual optical system and forms the image on a virtual sensor. By appropriately setting such a virtual optical system and a virtual sensor, refocusing as described previously is enabled. As an image capturing device for acquiring LF, a Plenoptic Camera (for example, as described in Japanese Patent Laid-Open No. 2009-124213) are known, in which a microlens array is placed behind a main lens and a camera array, in which compact cameras are arranged side by side. It is possible to obtain a multi-viewpoint image in which the image of a subject is captured in different viewpoints by capturing a single image. It is also possible to represent light field photography as the calculation of an image acquired by a virtual sensor under virtual optical conditions from multi-viewpoint image data. In the following, processing to calculate an image acquired by a virtual sensor is referred to as "refocus processing". In refocus processing, it is known to perform projective transformation on acquired multi-viewpoint image data onto a virtual sensor, and to add and average the image data (for example, as disclosed in WO2008050904).

In refocus processing, the value of a pixel on a virtual sensor is calculated using a pixel of a multi-viewpoint image corresponding to the position of the pixel. Normally, one pixel of a virtual sensor corresponds to a plurality of pixels of a multi-viewpoint image. Consequently, if the mounting position of a microlens array deviates from a reference position (design value), the pixel on the virtual sensor obtained by calculation is different from the pixel of the multi-view point image and the sharpness of the image obtained by the refocus processing is lost. In order to solve such a problem, a method is necessary to obtain an amount of shift between microlenses in a microlens array by calculation of multi-viewpoint image data (for example, as disclosed in Japanese Patent Laid-Open No. 2003-141529). Specifically, the method is a method of calculating an amount of shift between microlenses by performing a correlation operation of each piece of image data obtained via each microlens.

By the technique proposed in Japanese Patent Laid-Open No. 2003-141529, it is possible to obtain an amount of relative shift between each piece of image data obtained via each microlens, but, the deviation of the mounting position of the microlens array from the design value cannot be obtained. Consequently, it is not possible to provide an image refocused accurately at a desired subject distance.

SUMMARY OF THE INVENTION

An image processing device according to the present invention is characterized by including an image data acquiring unit configured to acquire calibration image data obtained by an image capturing device comprising an aperture configured to adjust an amount of transmitted light, a lens array in including a plurality of lenses, and an image sensing element configured to photo-electrically convert an image of a subject via the lens array;

wherein the image is obtained in a state where the aperture is stopped down in accordance with an instruction to calibrate the array; and a unit configured to acquire a position of an image on the image sensing element corresponding to each of the plurality of lenses based on the calibration image data.

According to the present invention, it is possible to obtain, with a high precision, the deviation of the position of each microlens from the design value in the microlens array (called a "microlens array" regardless of the size of each lens for convenience). Further, in the case where there is a deviation, it is possible to obtain a refocused image in which blurring is suppressed in a desired focus position by taking the amount of deviation into consideration at the time of refocus processing.

Further features of the present invention will become apparent from the following description of embodiments (with reference to the attached drawings). Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 15 is a table showing an example of information that a deviation calculating unit can output;

FIG. 19 is an example of intermediate data stored in a buffer;

DESCRIPTION OF THE EMBODIMENTS

[First Embodiment]

Figure 1:
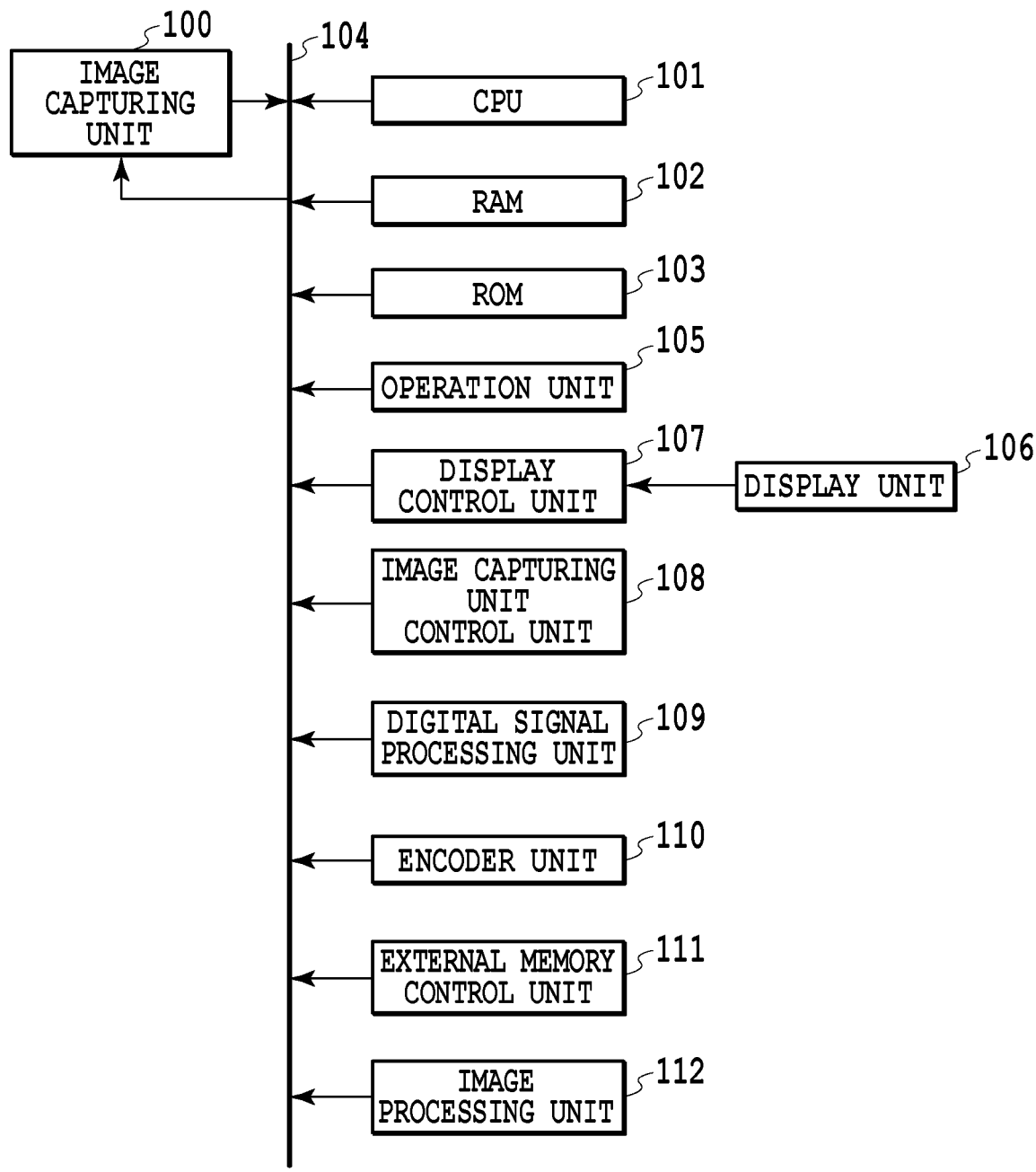
FIG. 1 is a block diagram showing an internal configuration of an image capturing device according to a first embodiment.

FIG. 1 is a block diagram showing an internal configuration of an image capturing device according to a first embodiment.

An image capturing unit 100 receives light information of a subject with an image sensing element and A/D converts the received signal to acquire color image data (digital data). Details of the image capturing unit 100 will be described later. A central processing unit (CPU) 101 totally controls each unit described below. A RAM 102 functions as a main memory, a work area etc., of the CPU 101. A ROM 103 stores control programs etc. executed by the CPU 101. A bus 104 is a transfer path of various kinds of data and for example, digital image data acquired by the image capturing unit 100 is sent to a predetermined processing unit via the bus 104. An operation unit 105 configured to receive a user's instruction includes buttons, mode dials, etc. In a display unit 106 configured to display captured images and characters, for example, a liquid crystal display is used. The display unit 106 may have a touch screen function and in such a case, it is also possible to handle a user's instruction using the touch screen as an input to the operation unit 105. A display control unit 107 controls a display of captured images and characters displayed on the display unit 106. An image capturing unit control unit 108 controls an image capturing system based on instructions from the CPU 101, such as focusing, opening/closing of a shutter, and adjustment of an aperture. A digital signal processing unit 109 performs various kinds of processing, such as white balance processing, gamma processing, and noise reduction processing, on digital data received via the bus 104. An encoder unit 110 performs processing to convert digital data into a file format, such as JPEG and MPEG. An external memory control unit 111 is an interface to connect to a PC and other media (for example, a hard disk, memory card, CF card, SD card, USB memory). An image processing unit 112 performs calibration of a microlens array provided in the image capturing unit 100 and refocus processing of color image data acquired by the image capturing unit 100 or color image data output from the digital signal processing unit 109. Details of the image processing unit 112 will be described later.

There exist components of the image capturing device other than those described above, but, those are not the main purpose of the present embodiment, and therefore, their explanation is omitted.

Figure 2:
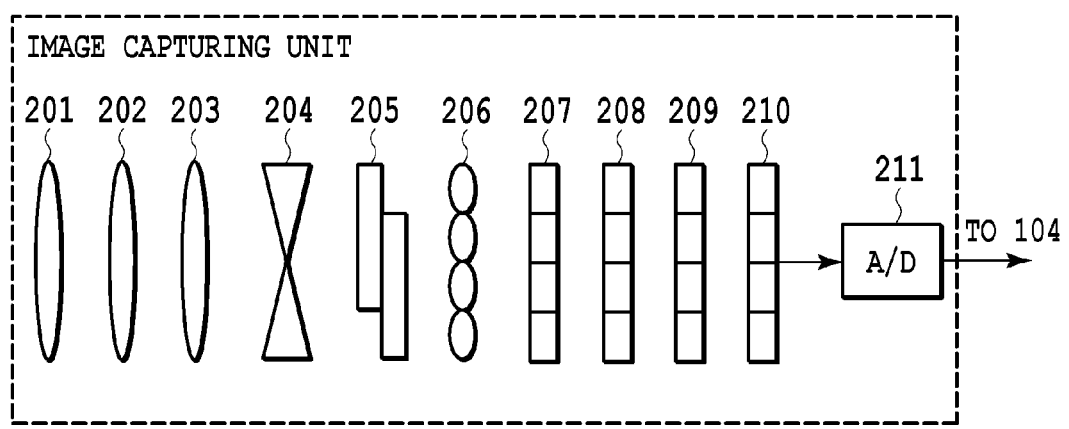
FIG. 2 is a diagram showing an internal configuration of an image capturing unit.

FIG. 2 is a diagram showing an internal configuration of the image capturing unit 100.

The image capturing unit 100 includes image capturing lenses 201 to 203, an aperture 204, a shutter 205, a microlens array 206, an optical low-pass filter 207, an iR cut filter 208, a color filter 209, an image sensing element (hereinafter, a sensor) 210 that performs photoelectric conversion, and an A/D conversion unit 211. The image capturing lenses 201 to 203 are the zoom lens 201, the focus lens 202, and the camera shake correction lens 203, respectively. By adjusting the aperture, the amount of light incident on the image capturing unit 100 can be adjusted. Even if the size of each lens is in units of micrometers or millimeters, the term "microlens array" is used regardless of the size of each lens for convenience sake.

<Principles of Refocus>

Figure 3:
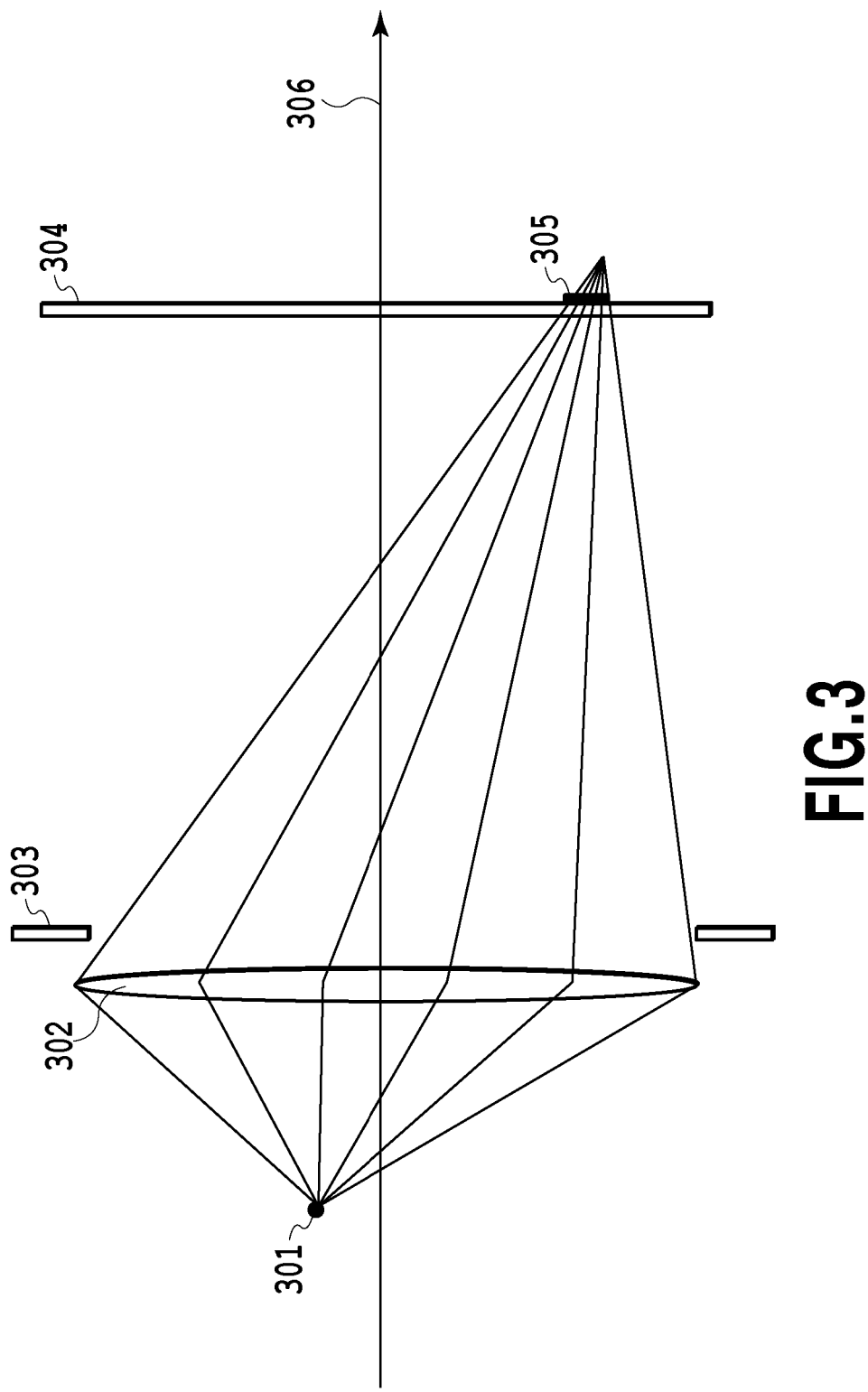
FIG. 3 is a diagram showing a configuration of a normal image capturing optical system.

FIG. 3 is a diagram showing a configuration of a normal image capturing optical system, representing an out-of-focus state. In FIG. 3, in order to simplify explanation, configurations of the shutter, the optical low-pass filter, the iR cut filter, the color filter, the zoom lens, etc., are omitted. Further, the lens configuration is represented by a main lens 302 as a typical lens group.

Light from an object point 301 is collected by the main lens 302 and reaches a partial region 305 of a sensor 304. The light collected by the main lens 302 reaches the sensor 304 before forming an image at one point, and therefore, in the partial region 305 of the sensor 304, the light from the object point 301 is recorded as spread light, resulting in a blurred image with less sharpness. In the case that it is desired to obtain an image with high sharpness, it is necessary to capture an image again after adjusting the focus position so that the image of the object point 301 is formed at one point on the sensor 304.

Figure 4:
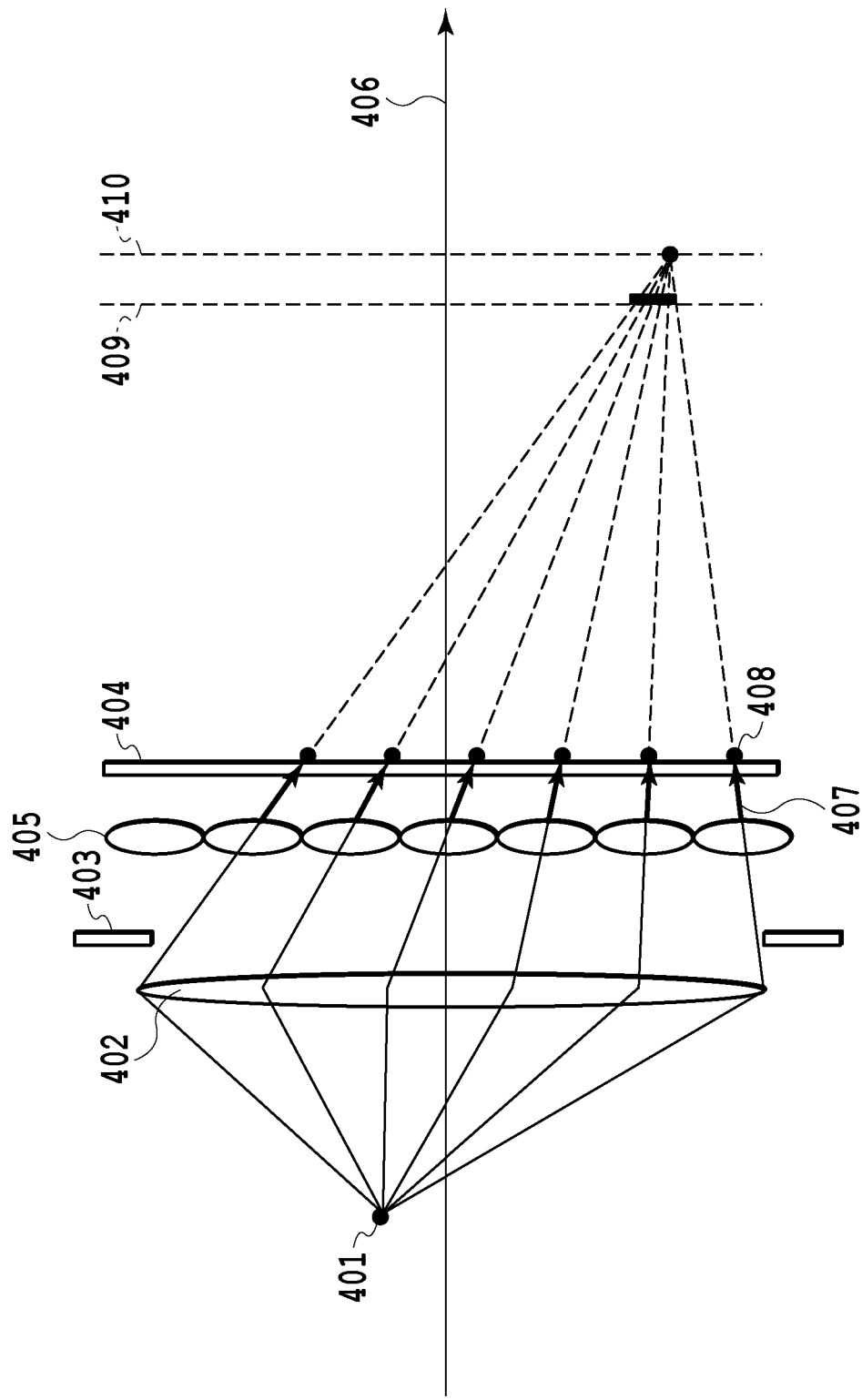
FIG. 4 is a diagram showing a configuration of the image capturing unit in association with the normal image capturing optical system.

FIG. 4 is a diagram showing the configuration of the image capturing unit 100 shown in FIG. 2 in association with the normal image capturing optical system shown in FIG. 3. In FIG. 4, a microlens array 405 corresponding to the microlens array 206 of FIG. 2 is added and the position of a sensor 404 is changed to a position nearer to a main lens 402. In FIG. 4, light emitted from an object point 401 is collected by the main lens 402 and then passes through the microlens array 405 before forming an image and is recorded with the sensor 404. At this time, the light emitted from the object point 401 is recorded as a value in accordance with the intensity of the light beam in a plurality of pixel positions on the sensor 404. That is, the optical image on the sensor (on the image sensing element) generated by one microlens is an image of the object point 401 observed in different directions, and therefore, in the sensor 404, images of multiple viewpoints are recorded as one image.

In the refocus processing, it is possible to obtain an image (refocused image) recorded in the virtual sensor by an arithmetic operation by extending the group of light beams and calculating the light intensity in the position of the virtual sensor. Here, calculation of an image recorded in the position of a virtual sensor A (409) provides a blurred image because the light from the object point 401 spreads. On the other hand, calculation of an image recorded in the position of a virtual sensor B (410) provides an image in focus because the light from the object point 401 converges on one point. The processing to adjust the position of the virtual sensor to acquire an image recorded in the position of the virtual sensor by calculation as described above corresponds to the operation to adjust the focus position in the normal optical system. As shown in FIG. 4, in order to obtain an image of the object point 401 observed in more different directions, it is preferable for the aperture 403 provided in the image capturing unit to be in the state where the aperture is opened as much as possible. The above is the principles of the refocus processing to obtain an image with the focus position adjusted by calculation after the image is captured.

Figure 5A:
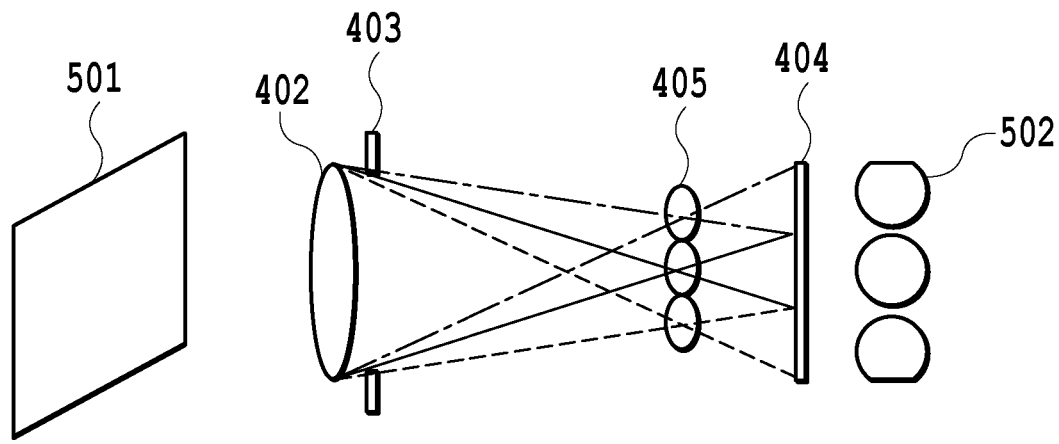
FIG. 5A is a diagram schematically showing a subject image recorded in a sensor in the case that an image of a uniform subject is captured in a state where a aperture is fully opened and FIG. 5B is a diagram schematically showing a subject image recorded in the sensor in the case that the image of the same subject is captured in a state where the aperture is stopped down.

FIG. 5A is a diagram schematically showing a subject image 502 recorded in the sensor 404 in the case that an image of a uniform subject 501 is captured in the state where the aperture 403 is fully opened in FIG. 4. Here, the shape of the aperture 403 is assumed to be a circle. In the case that capturing the image of the uniform subject such as the subject 501, in the state where there is no influence of shading, the shape of the image on the sensor 404 is substantially the same as the shape of the aperture 403, that is, a circle. In FIG. 5A, in the case that the images 502 on the sensor 404 obtained through the microlens array 405 are viewed, the shapes of the images 502 at the upper and lower end parts are quite different from a circle due to the shading of the main lens 402 compared to the shape of the image in the vicinity of the center.

Figure 5B:
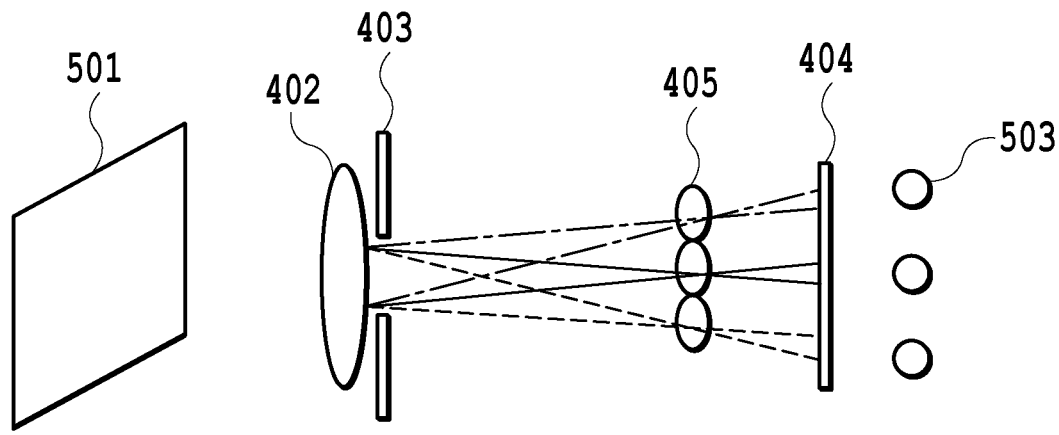

On the other hand, FIG. 5B is a diagram schematically showing a subject image 503 recorded in the sensor 404 in the case that capturing the image of the same subject 501 in the state where the aperture 403 is stopped down in FIG. 4. By stopping down the aperture 403, the influence of shading of the main lens 402 is suppressed and the shapes of the images 503 on the sensor 404 obtained through the microlens array 405 are substantially a uniform circle in each position.

Figure 6A:
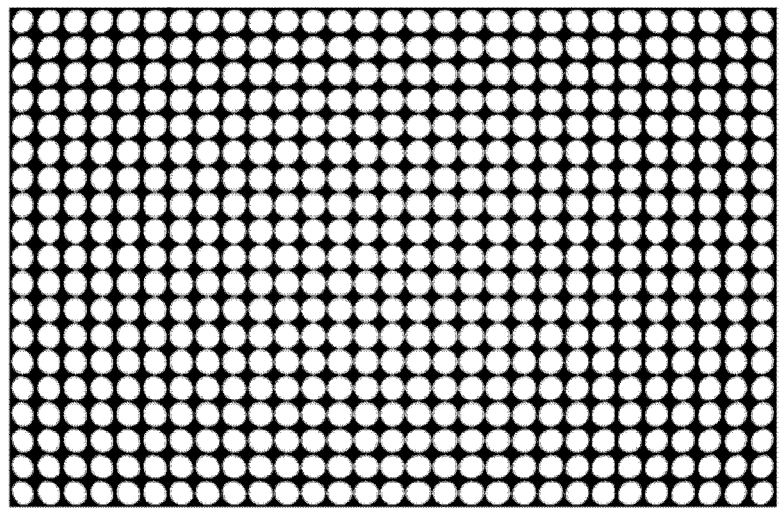
FIGS. 6A to 6C are diagrams showing a captured image on the sensor in the case that the image of a uniform surface light source is captured in the state where the aperture is fully opened.
Figure 6B:
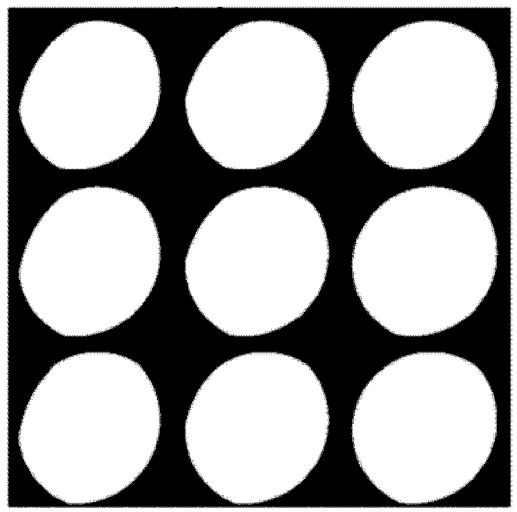
Figure 6C:
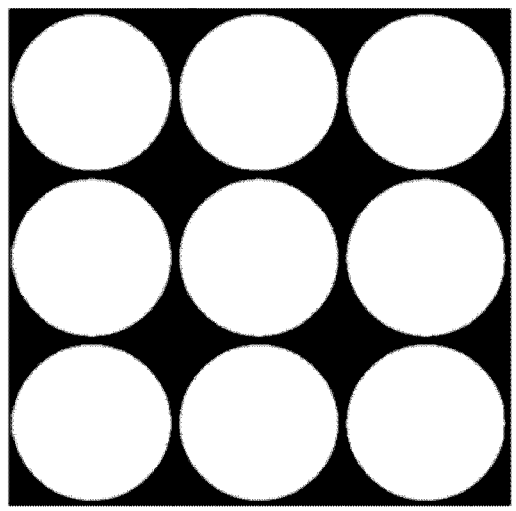

FIGS. 6A to 6C show a captured image on the sensor 404 in the case that capturing an image of a uniform surface light source in the state where the aperture 403 is fully opened (for example, F-number is 2.8). FIG. 6A shows the whole of the captured image, FIG. 6B is an enlarged view of the upper-left end part thereof, and FIG. 6C is an enlarged view of the center part thereof. In the enlarged view of the upper-left end part, the image through each microlens is deformed into an ellipse due to shading of the lens. In contrast to this, in the enlarged view of the center part, the influence of shading of the lens is slight, and therefore, the image through each microlens is not deformed and keeps a shape close to a perfect circle. As described above, in the case that capturing an image in the state where the aperture is fully opened, a spatial unevenness occurs in the shape of the image on the sensor. However, as explained in FIG. 4, in order to obtain a subject image observed in more different viewpoints, it is preferable to capture the image of a subject in the state where the aperture is fully opened.

Figure 7A:
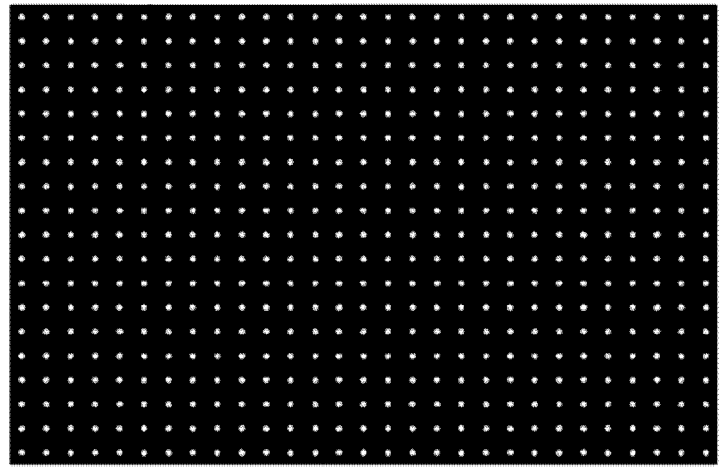
FIGS. 7A to 7C are diagrams showing a captured image on the sensor in the case that the image of the uniform surface light source is captured in the state where the aperture is stopped down.
Figure 7B:
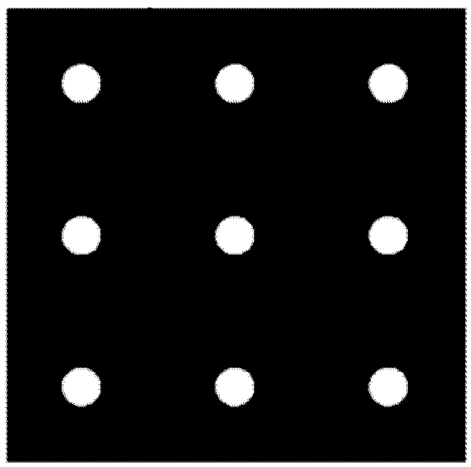
Figure 7C:
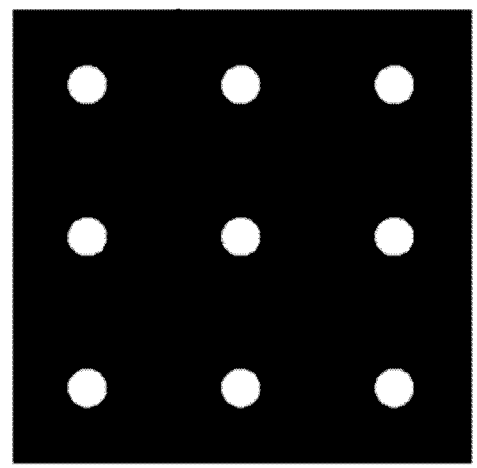

FIGS. 7A to 7C show a captured image on the sensor 404 in the case that capturing an image of a uniform surface light source in the state where the aperture 403 is stopped down (for example, F-number is 11). FIG. 7A shows the whole of the captured image, FIG. 7B is an enlarged view of the upper-left end part thereof, and FIG. 7C is an enlarged view of the center part thereof. Different from FIGS. 6A to 6C, the influence of shading of the lens is slight in each part and even in the enlarged view of the upper-left end part (FIG. 7B), the image through each microlens is not deformed and keeps a circular shape.

Calibration of the microlens array to be described later is performed by making use of the characteristic that in the case that an image is captured in the state where the aperture is stopped down, the shape of the image on the sensor obtained through each microlens array is substantially the same as described above.

<Explanation of the Image Processing Unit 112>

Figure 8:
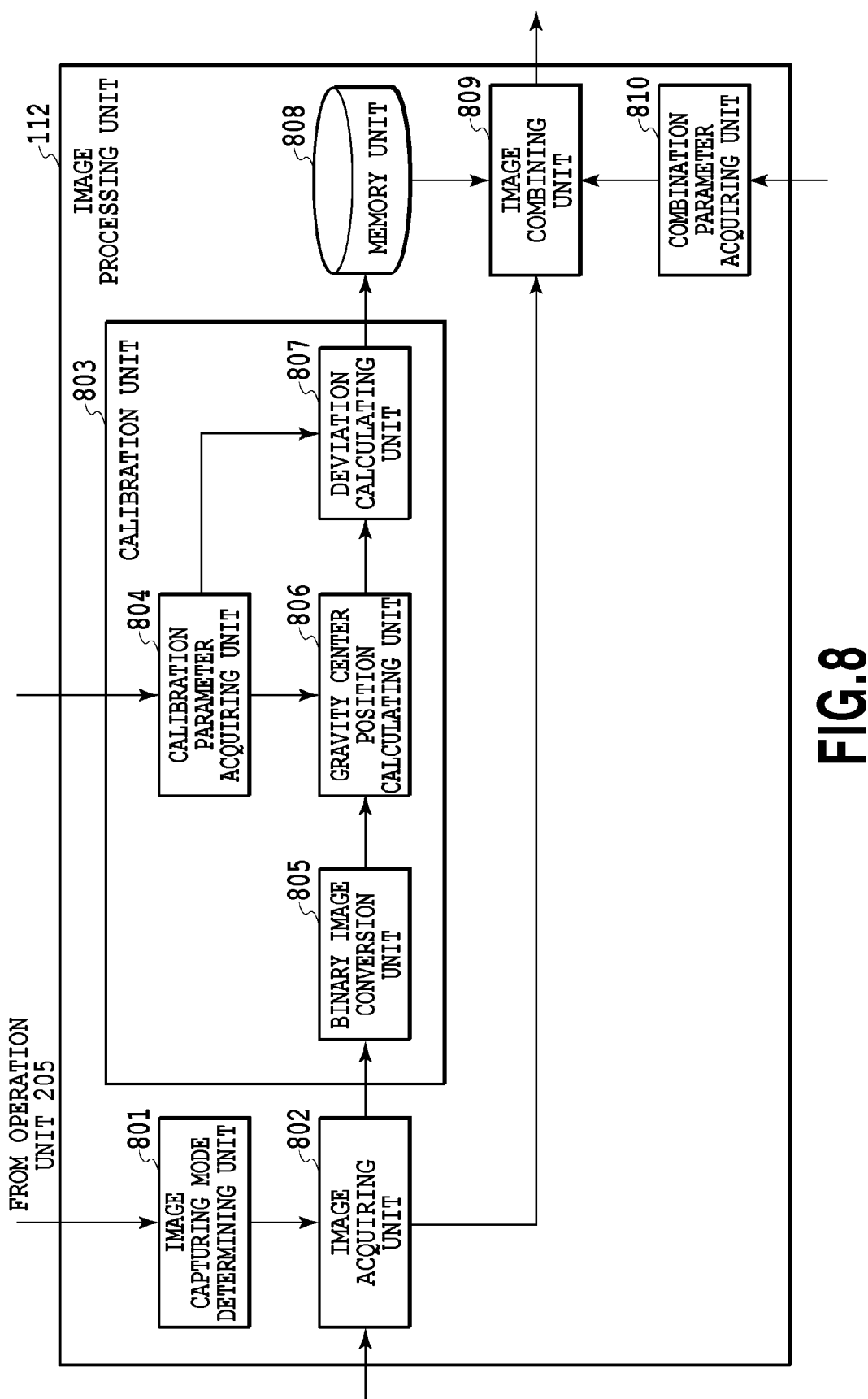
FIG. 8 is a block diagram showing an internal configuration of an image processing unit according to the first embodiment.

FIG. 8 is a block diagram showing an internal configuration of the image processing unit 112.

The image processing unit 112 mainly includes a calibration unit 803, a memory unit 808, and an image combining unit 809. The calibration unit 803 calculates the optical center position of each microlens in the microlens array 206 of the image capturing unit 100. The memory unit 808 stores the result of the calibration unit 803. The image combining unit 809 combines images based on the calibration result.

An image capturing mode determining unit 801 determines whether or not an instruction from a user is calibration of the microlens array and whether or not it is the final image capturing.

Reference numeral 802 represents an image acquiring unit (captured image data acquiring unit) configured to acquire color image data supplied from the image capturing unit 100 via the bus 104.

A calibration parameter acquiring unit 804 acquires various parameters necessary for calibration. Specifically, the calibration parameter acquiring unit 804 acquires the numbers of microlenses in the vertical and horizontal directions arranged in the microlens array 206, the optical center position of each microlens on the sensor obtained from the design value, and the gravity center position of the image on the sensor via the microlens.

Reference numeral 805 represents a binary image conversion unit configured to convert color image data into binary image data.

A gravity center position calculating unit 806 receives parameters supplied from the calibration parameter acquiring unit 804 and binary image data supplied from the binary image conversion unit 805 and calculates the gravity center position of each image on the sensor through each microlens.

A deviation calculating unit 807 calculates information for performing accurate refocus processing in the image combination processing, such as a deviation of the position of each microlens in the microlens array 206 from the design value or the actual optical center position of each microlens reflecting the deviation.

A combination parameter acquiring unit 810 acquires optical data etc. of the image capturing unit 100 required by the image combining unit 809.

The image combining unit 809 generates combined image data in an arbitrary focus position.

The whole or part of the image processing unit 112 according to the present embodiment can be effected as an independent image processing device and can be implemented by being appropriately incorporated in the image capturing device main body, PC, etc.

Figure 9:
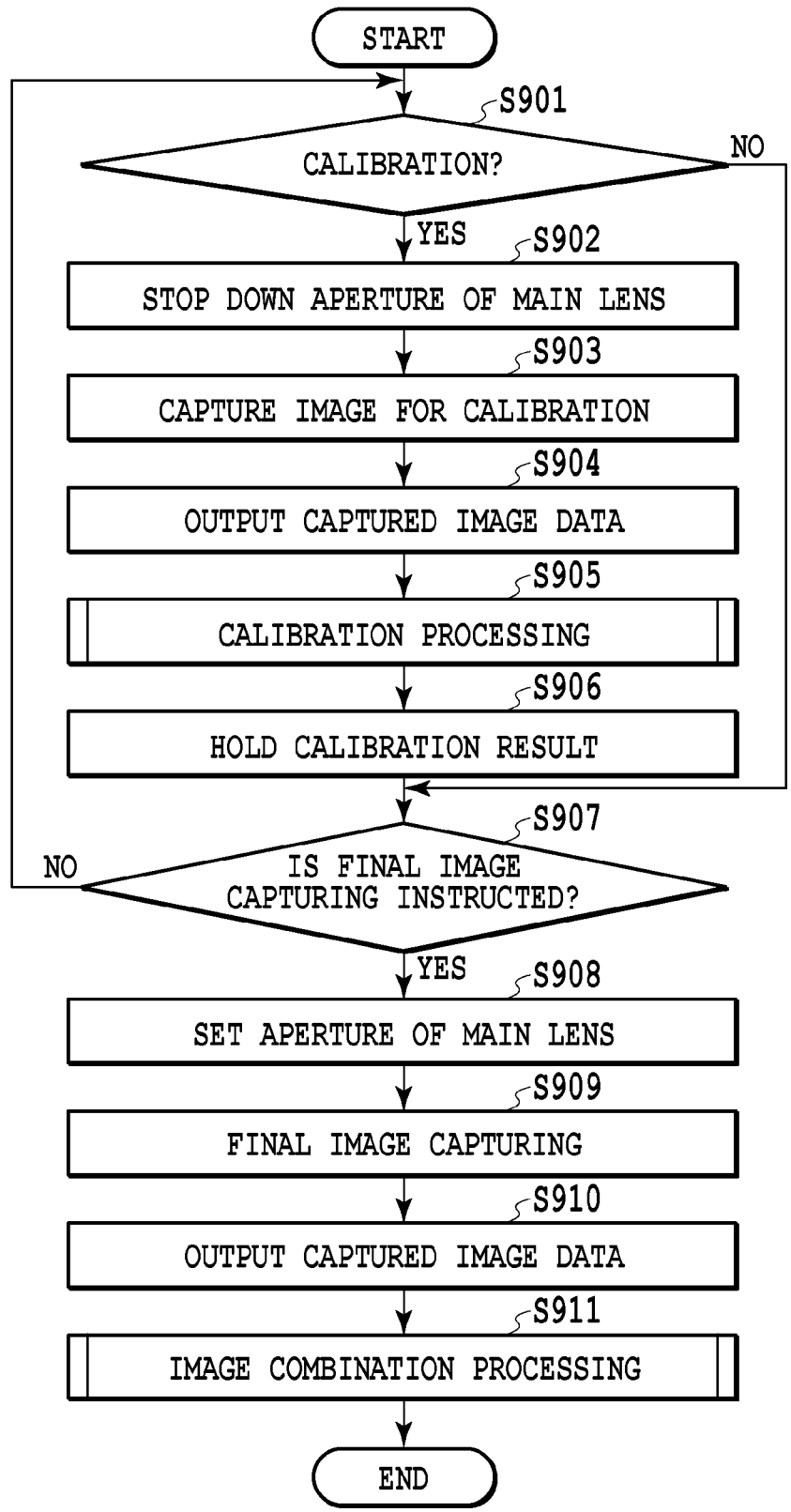
FIG. 9 is a flowchart showing a flow of a series of processing from execution of calibration to output of combined image data in the image capturing device according to the first embodiment.

FIG. 9 is a flowchart showing a flow of a series of processing from execution of calibration to output of combined image data in the image capturing device according to the present embodiment. The series of processing is performed in the case that the CPU 101 reads computer-executable programs in which the procedure shown below is described from the ROM 103 onto the RAM 102, and thereafter executes the programs.

At step 901, the image capturing mode determining unit 801 determines whether or not a user's instruction relating to the image capturing mode supplied from the operation unit 105 is an instruction of calibration. In the case that the user's instruction is the instruction of calibration, the procedure proceeds to step 902. On the other hand, in the case that it is not the instruction of calibration, the procedure proceeds to step 907.

At step 902, the aperture of the main lens 402 is stopped down. Specifically, the image capturing unit control unit 108 adjusts the aperture of the main lens 402 so that the f-stop (F-number) becomes a value (for example, F11) relatively larger than that at the time of the final image capturing.

At step 903, the image capturing unit 100 captures an image of a subject to be used for calibration of the microlens array 405. As a subject image used for calibration, a bright subject having a comparatively uniform luminance distribution is preferable in order to improve precision of calibration.

At step 904, the digital signal processing unit 109 outputs data of an image captured for calibration (calibration image data).

At step 905, the calibration unit 803 performs calibration of the microlens array 405. Details of calibration processing will be described later.

At step 906, the memory unit 808 holds the result of calibration supplied from the calibration unit 803.

At step 907, the image capturing mode determining unit 801 determines whether or not a user's instruction relating to the image capturing mode supplied from the operation unit 105 is an instruction of the final image capturing. In the case that the user's instruction is the instruction of the final image capturing, the procedure proceeds to step 908. On the other hand, in the case that it is not the instruction of the final image capturing, the procedure returns to step 901.

At step 908, the image capturing unit control unit 108 sets the aperture of the main lens 402 to an arbitrary value. Specifically, the aperture of the main lens 402 is adjusted so that the f-stop (F-number) becomes a value (for example, F2.8) relatively smaller than that at the time of calibration.

At step 909, the image capturing unit 100 captures an image of a subject, which is the final image capturing.

At step 910, the digital signal processing unit 109 outputs the data of the image captured for the final image capturing.

At step 911, the image combining unit 809 performs image combination processing in an arbitrary focus position. Details of image combination processing will be described later.

<Calibration Processing>

Next, details of calibration processing at step 905 are explained.

Figure 10:
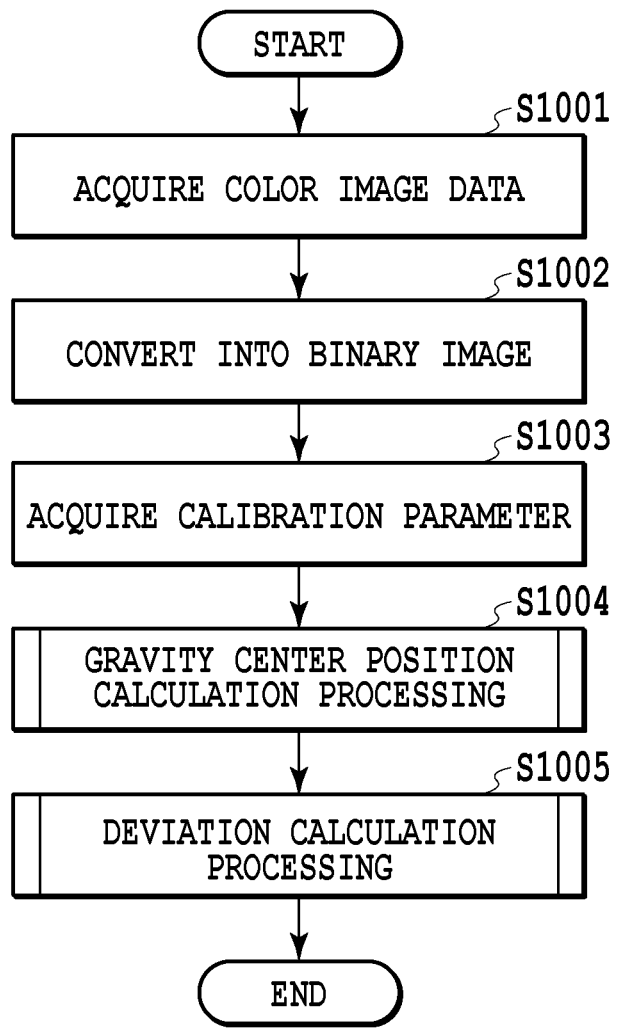
FIG. 10 is a flowchart showing a flow of calibration processing.

FIG. 10 is a flowchart showing a flow of processing in the calibration unit 803.

At step 1001, the calibration unit 803 receives calibration image data from the image acquiring unit 802. The calibration image data received here is data of a color image captured in the state where the aperture is stopped down (see FIGS. 7A to 7C).

At step 1002, the binary image conversion unit 805 converts the color image data into binary image data I (x, y). Here, (x, y) is coordinates that represent a pixel position on the sensor. The binary image conversion unit 805 compares the pixel value in the color image data with a threshold value specified in advance and converts the color image data into the binary image data I (x, y) so that the pixel value of the pixel position represented in white is "1" and the pixel value of the pixel position represented in black is "0". For example, the binary image conversion unit 805 converts the color image into a monochrome image and then sets the median of the pixel value of the monochrome image to the threshold value and thus converts the color image into a binary image.

At step 1003, the calibration parameter acquiring unit 804 acquires various parameters that are necessary for calibration of the microlens array. Specifically, the calibration parameter acquiring unit 804 acquires information, such as the number of sensor pixels, the numbers of microlenses in the vertical and horizontal directions, the gravity center position of the image on the sensor corresponding to each microlens obtained from the design value, and the optical center position of each microlens obtained from the design value. It is assumed that the microlens array has a configuration in which M microlenses are arranged in the horizontal direction and N microlenses in the vertical direction (M, N are natural numbers).

At step 1004, the gravity center position calculating unit 806 calculates the gravity center position of the image on the sensor via each microlens from the binary image data obtained at step 1002. Details of gravity center position calculation processing will be described later.

At step 1005, the deviation calculating unit 807 calculates the deviation of the position of each microlens from the design value (or information equivalent thereto). Details of deviation calculation processing will be described later.

<Gravity Center Position Calculation Processing>

Next, details of gravity center position calculation processing at step 1004 are explained.

Figure 11:
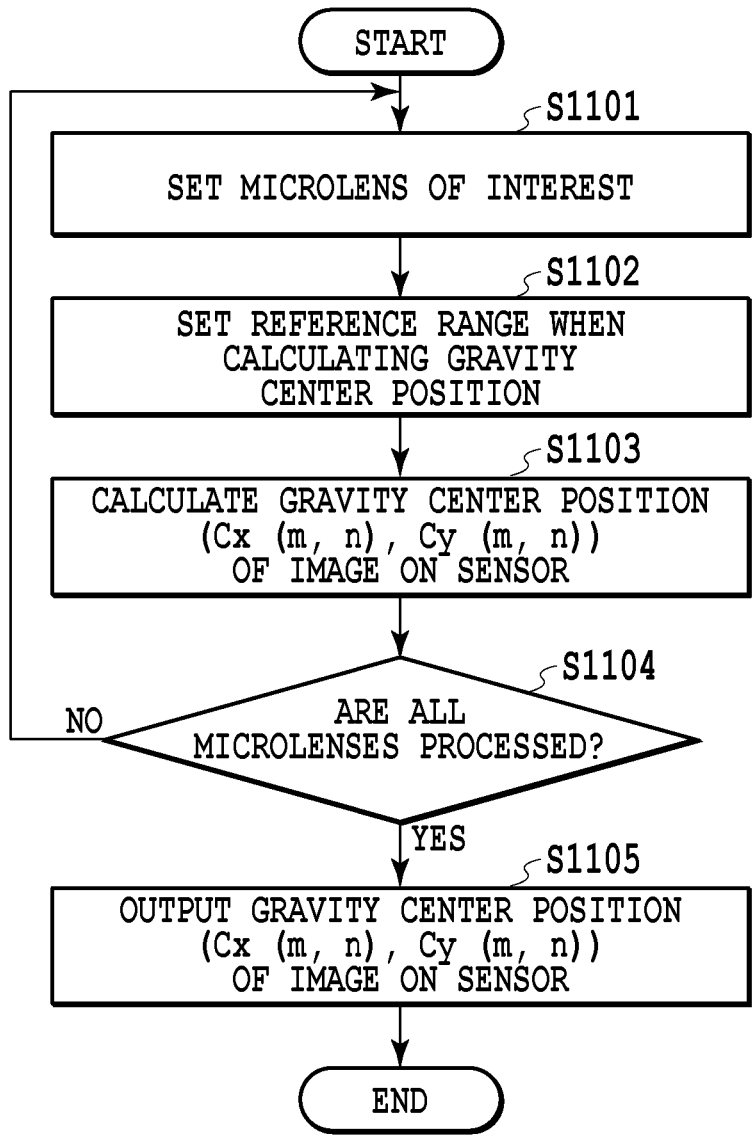
FIG. 11 is a flowchart showing a flow of gravity center position calculation processing.

FIG. 11 is a flowchart showing a flow of processing in the gravity center position calculating unit 806.

At step 1101, the gravity center position calculating unit 806 sets a microlens (m, n) of interest, which is the target of processing. Here, (m, n) represents coordinates indicating the position of the microlens and m is the coordinate representing the horizontal position and n is the coordinate representing the vertical position. Here, (m, n) is integer values, that is, m=0, 1, . . . , M−1 and n=0, 1, . . . , N−1, where M is the number of microlenses in the horizontal direction and N is the number of microlenses in the vertical direction. At the time of start of processing, as initial values, (m, n)=(0, 0) is set.

At step 1102, the gravity center position calculating unit 806 sets a reference range used in the case that calculating the gravity center position. Specifically, a reference range that satisfies Formula (1) to Formula (4) below is set.

$$Lx(m) \leq x < Lx(m+1) \qquad \text{Formula (1)}$$

$$Ly(n) \leq y < Ly(n+1) \qquad \text{Formula (2)}$$

$$Lx(m) = (Sx/M) \times m + a \qquad \text{Formula (3)}$$

$$Ly(n) = (Sy/M) \times m + b \qquad \text{Formula (4)}$$

Figure 12:
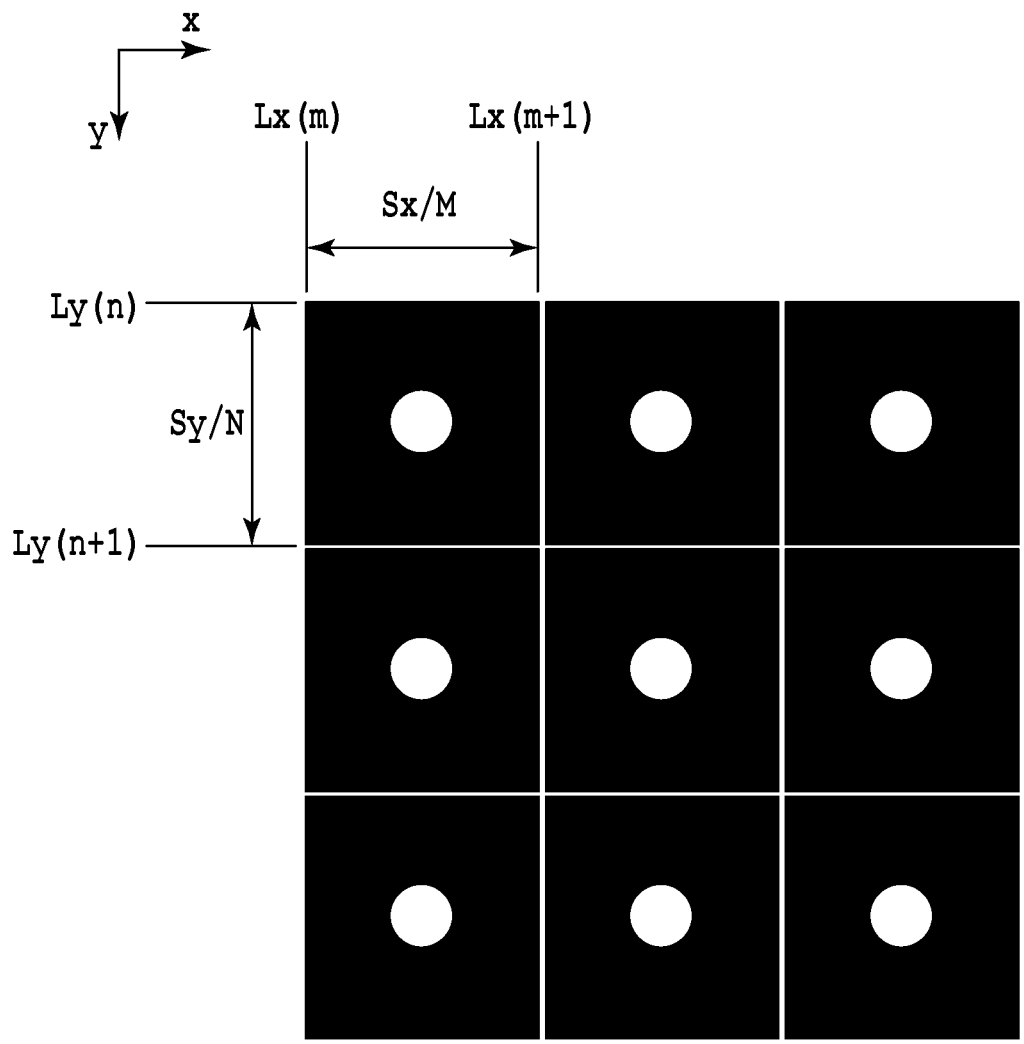
FIG. 12 is a diagram for explaining a reference range in the case that calculating the gravity center position.

Here, (x, y) represents the pixel position on the sensor, Sx is the number of pixels of the sensor in the horizontal direction, Sy is the number of pixels of the sensor in the vertical direction, and a and b are offset values. FIG. 12 is a diagram for explaining the reference range set at the present step. In FIG. 12, the upper-left end part shows the microlens (m, n) of interest and by appropriately setting the values of the offset values a and b, the reference range is set so that the image on the sensor of the microlens of interest is included.

Explanation is returned to the flowchart of FIG. 11.

In the case that the reference range used in the case that calculating the gravity center position is set at step 1102, the gravity center position calculating unit 806 obtains a gravity center position (Cx (m, n), Cy (m, n)) of the image on the sensor corresponding to the microlens of interest (m, n) at step 1103. Specifically, the gravity center position is calculated using Formula (5) to Formula (7) below.

$$C_x(m, n) = \frac{1}{S} \sum_{y=Ly(n)}^{Ly(n+1)-1} \sum_{x=Lx(m)}^{Lx(m+1)-1} I(x, y)x \qquad \text{Formula (5)}$$

$$C_y(m, n) = \frac{1}{S} \sum_{y=Ly(n)}^{Ly(n+1)-1} \sum_{x=Lx(m)}^{Lx(m+1)-1} I(x, y)y \qquad \text{Formula (6)}$$

$$S = \sum_{y=Ly(n)}^{Ly(n+1)-1} \sum_{x=Lx(m)}^{Lx(m+1)-1} I(x, y) \qquad \text{Formula (7)}$$

Here, I (x, y) is the binary image data converted in the binary image conversion unit 805 and a value of "1" is input to the pixel corresponding to the image on the sensor corresponding to the microlens and a value of "0" is input to other pixel positions. S represents the number of pixels whose pixel value is "1" of the image data I (x, y) included in the reference range.

At step 1104, the gravity center position calculating unit 806 determines whether or not the processing to calculate the gravity center position of the image on the sensor is completed for all the microlenses. In the case that there is a microlens which has not been processed yet, the procedure returns to step 1101 and the next microlens (m, n) of interest is set and the processing from step 1102 to step 1104 is repeated. On the other hand, in the case that the gravity center position calculating unit 806 determines that the processing to calculate the gravity center position of the image on the sensor is completed for all the microlenses, the procedure proceeds to step 1105.

At step 1105, the gravity center position calculating unit 806 outputs the gravity center position (Cx (m, n), Cy (m, n)) of the image on the sensor corresponding to each microlens obtained from the captured image data (binary image data).

<Deviation Calculation Processing>

Next, details of deviation calculation processing at step 1005 are explained. Here, processing is explained in the case where an amount of deviation of the position of each microlens from the design value is calculated and further, the actual optical center position of each microlens that reflects the amount of deviation is calculated and output.

Figure 13:
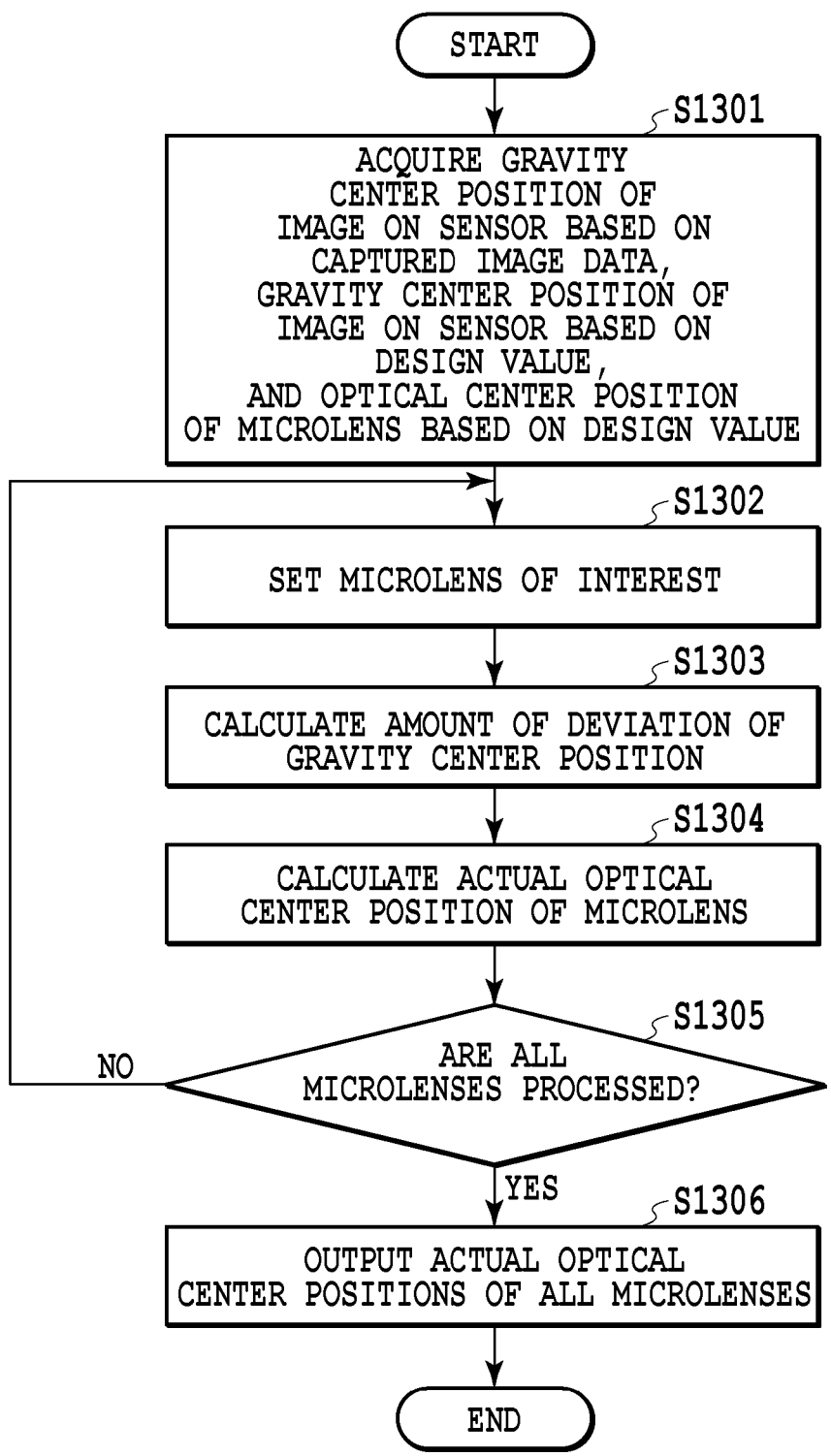
FIG. 13 is a flowchart showing a flow of deviation calculation processing.

FIG. 13 is a flowchart showing a flow of processing in the deviation calculating unit 807.

At step 1301, the deviation calculating unit 807 acquires the gravity center position of the image on the sensor based on the captured image data and the design value, respectively, and the optical center position of each microlens based on the design value. The gravity center position (Cx (m, n), Cy (m, n)) of the image on the sensor based on the captured image data is acquired from the gravity center position calculating unit 806. A gravity center position (Cx_s (m, n), Cy_s (m, n)) of the image on the sensor based on the design value and an optical center position (Ox_s (m, n), Oy_s (m, n)) of each microlens based on the design value are acquired from the calibration parameter acquiring unit 804.

At step 1302, the deviation calculating unit 807 sets the microlens (m, n) of interest, which is the target of processing. At the time of start of processing, as initial values, (m, n)=(0, 0) is set.

At step 1303, the deviation calculating unit 807 obtains a deviation between the gravity center position (Cx (m, n), Cy (m, n)) of the image on the sensor calculated from the captured image data and the gravity center position (Cx_s (m, n), Cy_s (m, n)) of the image on the sensor obtained from the design value. Specifically, an amount of deviation (Sx (m, n), Sy (m, n)) between both the gravity center positions is calculated from Formula (8) and Formula (9) below.

$$Sx(m,n) = Cx(m,n) - Cx\_s(m,n) \qquad \text{Formula (8)}$$

$$Sy(m,n) = Cy(m,n) - Cy\_s(m,n) \qquad \text{Formula (9)}$$

At step 1304, the deviation calculating unit 807 obtains the actual optical center position of the microlens of interest from the calculated amount of deviation (Sx (m, n), Sy (m, n)) and the optical center position (Ox_s (m, n), Oy_s (m, n)) based on the design value. Specifically, the deviation calculating unit 807 calculates an actual optical center position (Ox (m, n), Oy (m, n)) of the microlens from Formula (10) and Formula (11) below.

$$Ox(m,n) = Ox\_s(m,n) + Sx(m,n) \qquad \text{Formula (10)}$$

$$Oy(m,n) = Oy\_s(m,n) + Sy(m,n) \qquad \text{Formula (11)}$$

In the present embodiment, the amount of deviation of the gravity center position of the image on the sensor corresponding to each microlens is obtained and the actual optical center position of each microlens is calculated based on the obtained amount of deviation. The reason for that is as follows.

Figure 14:
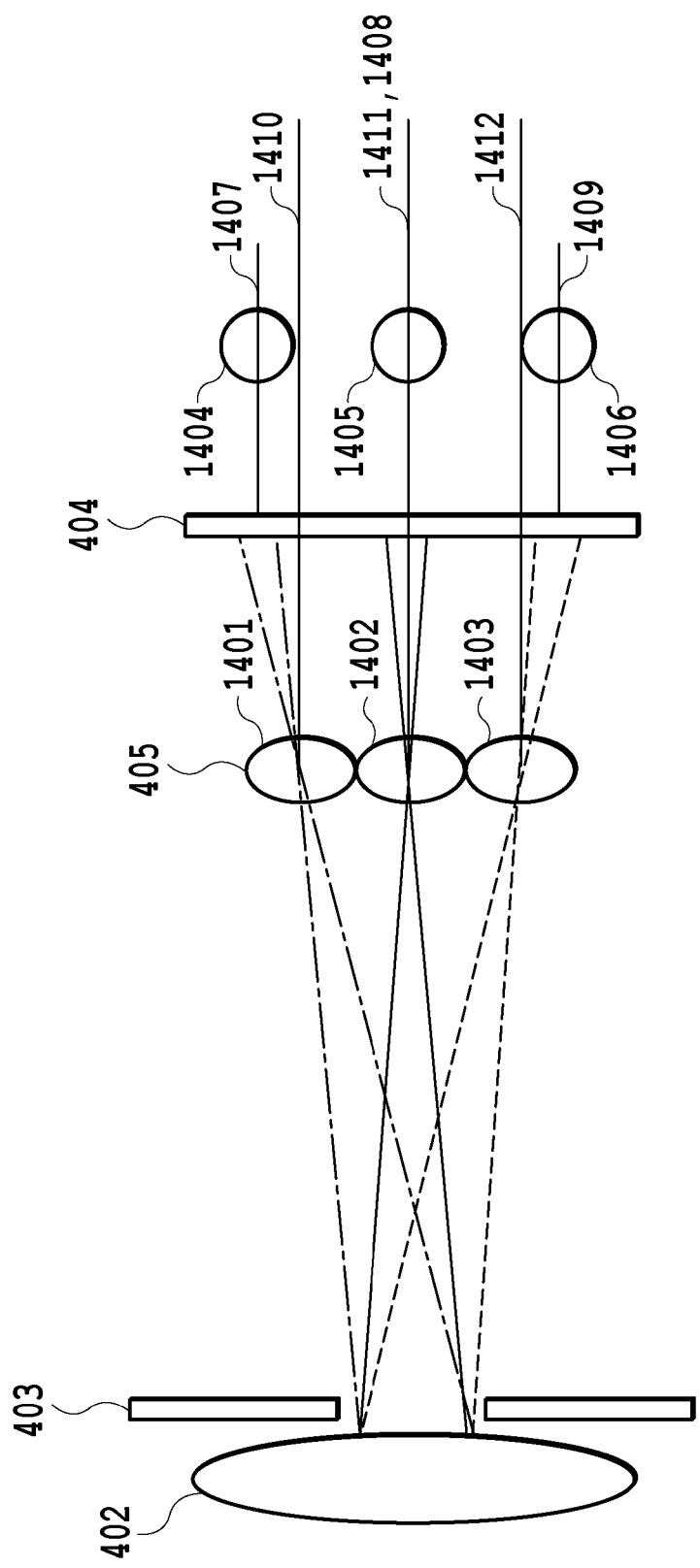
FIG. 14 is a diagram showing a relationship between the gravity center position of an image on the sensor corresponding to each microlens and the actual optical center position of each microlens.

FIG. 14 is a diagram showing a relationship between the gravity center position of the image on the sensor corresponding to each microlens and the actual optical center position of each microlens. As is obvious from FIG. 14, images 1404 to 1406 on the sensor 404 obtained through the microlens array 405 in the present embodiment are formed into substantially a perfect circle. In this case, the light incident on a microlens 1402 arranged in the vicinity of the center of the microlens array 405 enters in parallel from the direction of the front side. Because of this, a gravity center position 1408 of the image 1405 on the sensor 404 agrees with an optical center position 1411 of the microlens. However, the light incident on a microlens 1401 or 1403 arranged at the end part of the microlens array 405 enters in an oblique direction. Because of this, a gravity center position 1407 of the image 1404 (a gravity center position 1409 of the image 1406) on the sensor 404 does not agree with an optical center position 1410 (an optical center position 1412) of the microlens. As described above, it is recognized that to obtain the actual optical center position of the microlens from the gravity center position of the image formed on the sensor 404 is difficult particularly at the end part of the microlens array 405. Because of this, in the present embodiment, the actual optical center position of each microlens is obtained by obtaining the amount of deviation between the gravity center position of the image on the sensor corresponding to each microlens calculated from the captured image data and the gravity center position of the image on the sensor obtained from the design value.

Explanation is returned to the flowchart of FIG. 13.

At step 1305, the deviation calculating unit 807 determines whether or not the calculation of the actual optical center position of the microlens is completed for all the microlenses. In the case that there is a processed microlens which has not been processed yet, the procedure returns to step 1302 and the next microlens (m, n) of interest is set and the processing at step 1302 to 1304 is repeated. On the other hand, in the case that deviation calculating unit 807 determines that the calculation of the actual optical center position of the microlens is completed for all the microlenses, the procedure proceeds to step 1306.

At step 1306, the deviation calculating unit 807 outputs the calculated actual optical center position of each microlens. Here, only the actual optical center position of each microlens obtained from the amount of deviation of the gravity center position of the image on the sensor is output, but, this is not limited. What is required is to reflect the deviation of the position of each microlens from the design value in image combination processing to be described layer, and information necessary for that is output. FIG. 15 is a table showing an example of information that can be output at the present step. Here, each piece of information is shown, such as the gravity center position of the image on the sensor based on the captured image data, the gravity center position of the image on the sensor based on the design value, the optical center position of the microlens based on the design value, the amount of deviation of the gravity center position of the image on the sensor, and the actual optical center position of the microlens. For example, in the present embodiment, information of the optical center position of the microlens based on the design value, which is stored in advance in the RAM 102 etc., is read and acquired during image combination processing (step 1701 to be described later). However, it may also be possible to omit acquisition of the optical center position of the microlens based on the design value during image combination processing by outputting the information of the optical center position of the microlens based on the design value also together with the information of the actual optical center position at the present step. As described above, the contents of the output in the deviation calculation processing are determined after the contents of the subsequent processing are taken into consideration.

<Image Combination Processing>

Figure 16:
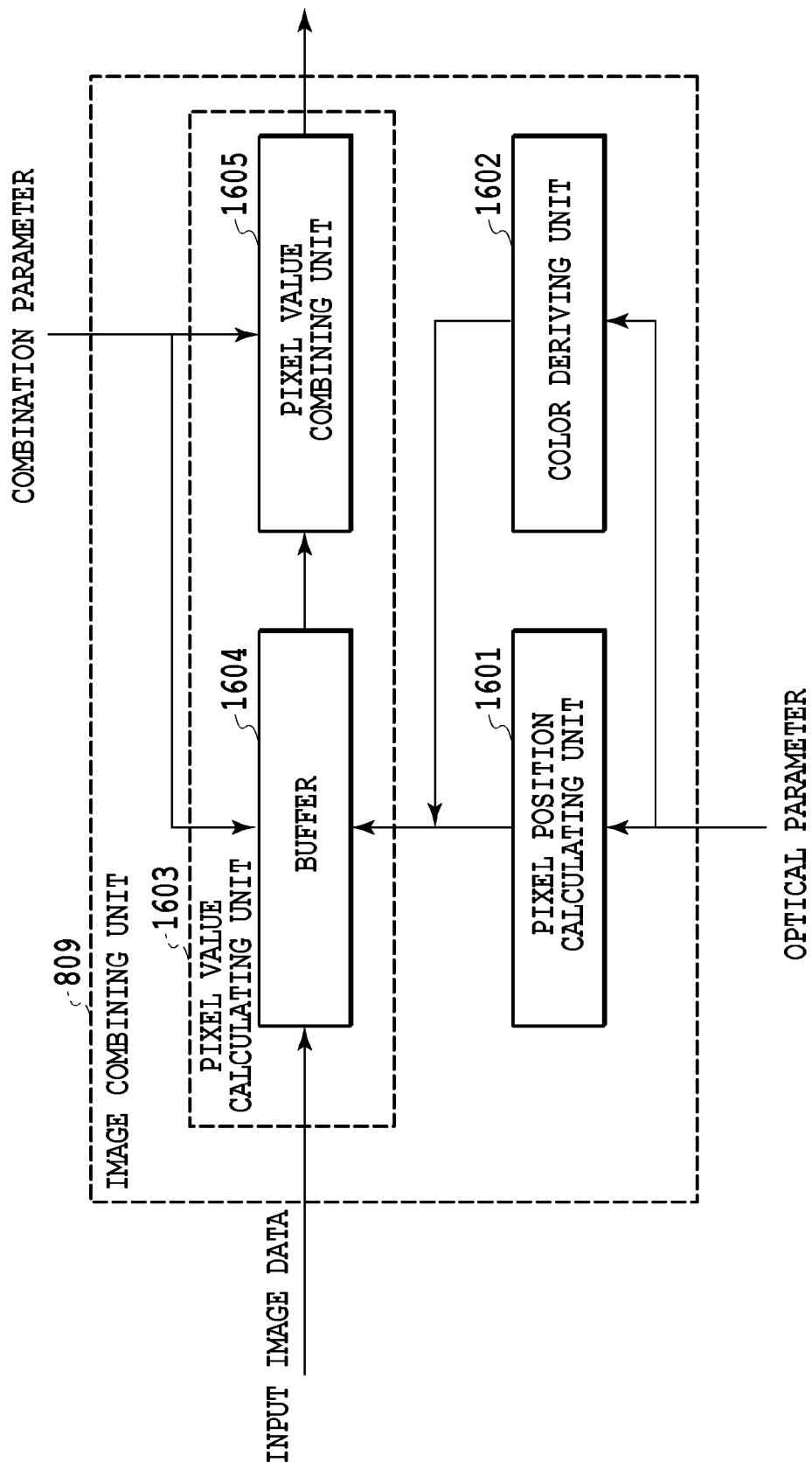
FIG. 16 is a block diagram showing an internal configuration of an image combining unit.

Next, details of image combination processing at step 911 are explained. FIG. 16 is a diagram showing an internal configuration of the image combining unit 809.

The image combining unit 809 includes a pixel position calculating unit 1601, a color deriving unit 1602, and a pixel value calculating unit 1603 and further, the pixel value calculating unit 1603 includes a buffer 1604 and a pixel value combining unit 1605. In the image combining unit 809, the pixel value in the combined image is calculated from the input image data (multi-viewpoint image data) of digital value sent from the image acquiring unit 802 and processing to output pixel values in order of calculation is performed in these units. This will be explained in detail below.

Figure 17:
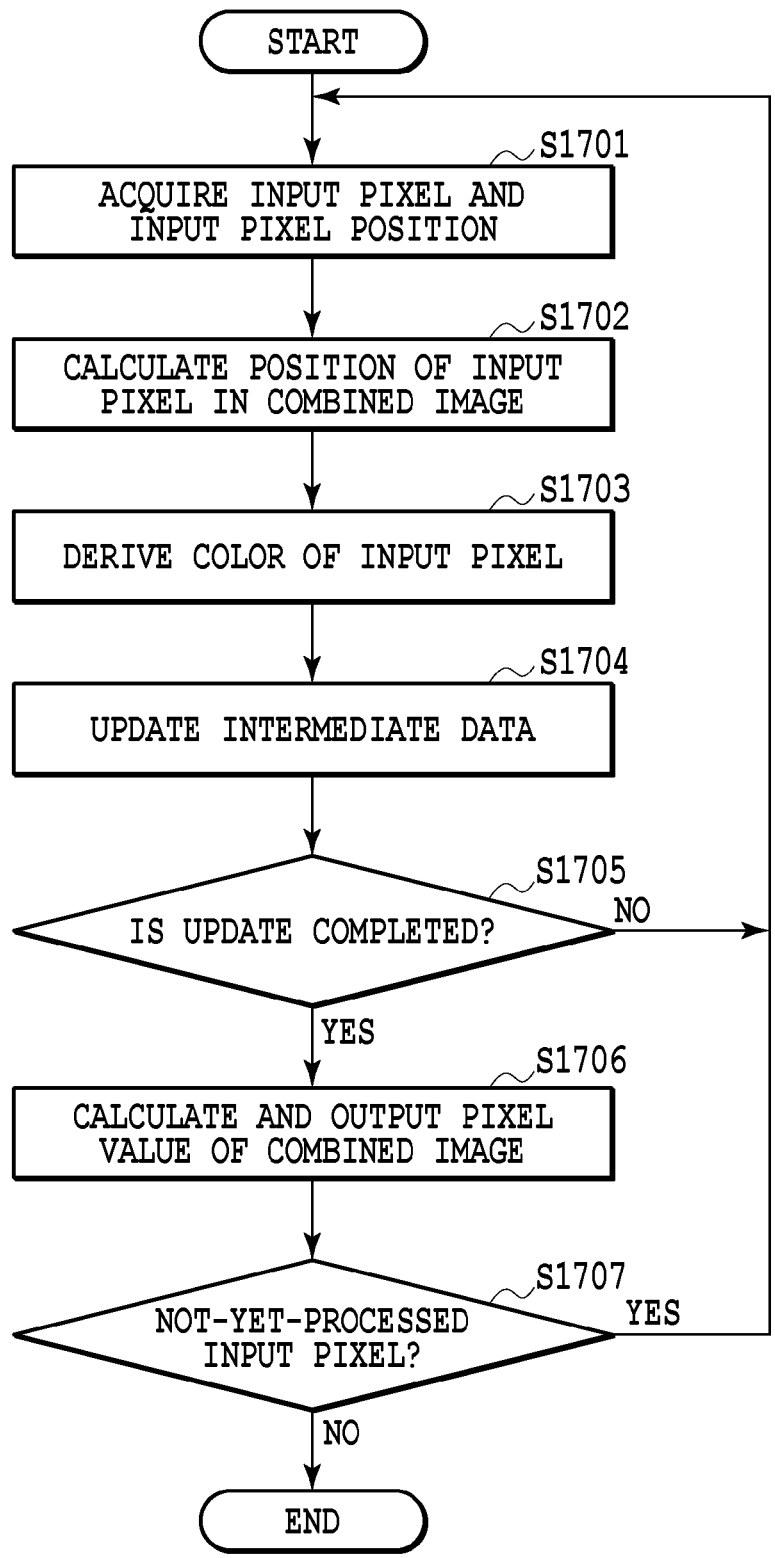
FIG. 17 is a flowchart showing a flow of image combination processing.

FIG. 17 is a flowchart showing a flow of image combination processing. In order to simplify explanation, it is assumed that the input image data of digital value supplied from the image acquiring unit 802 is one-dimensional.

At step 1701, the image combining unit 809 acquires the pixel value and the pixel position of a predetermined pixel in the input image data, and further, optical parameters and combination parameters necessary for image combination. Here, the optical parameters refer to physically specified various parameters at the time of image capturing, and for example, the optical center position of the microlens obtained from the design value and values such as σ real. This information is acquired by reading what is held in advance in the RAM 102 etc. The combination parameters refer to various parameters relating to image processing and the setting of which can be changed appropriately, and for example, values such as σ virtual corresponding to an arbitrary focus position. This information is acquired, for example, based on the input operation from a user for specifying an arbitrary focus position via the operation unit 105.

Figure 18:
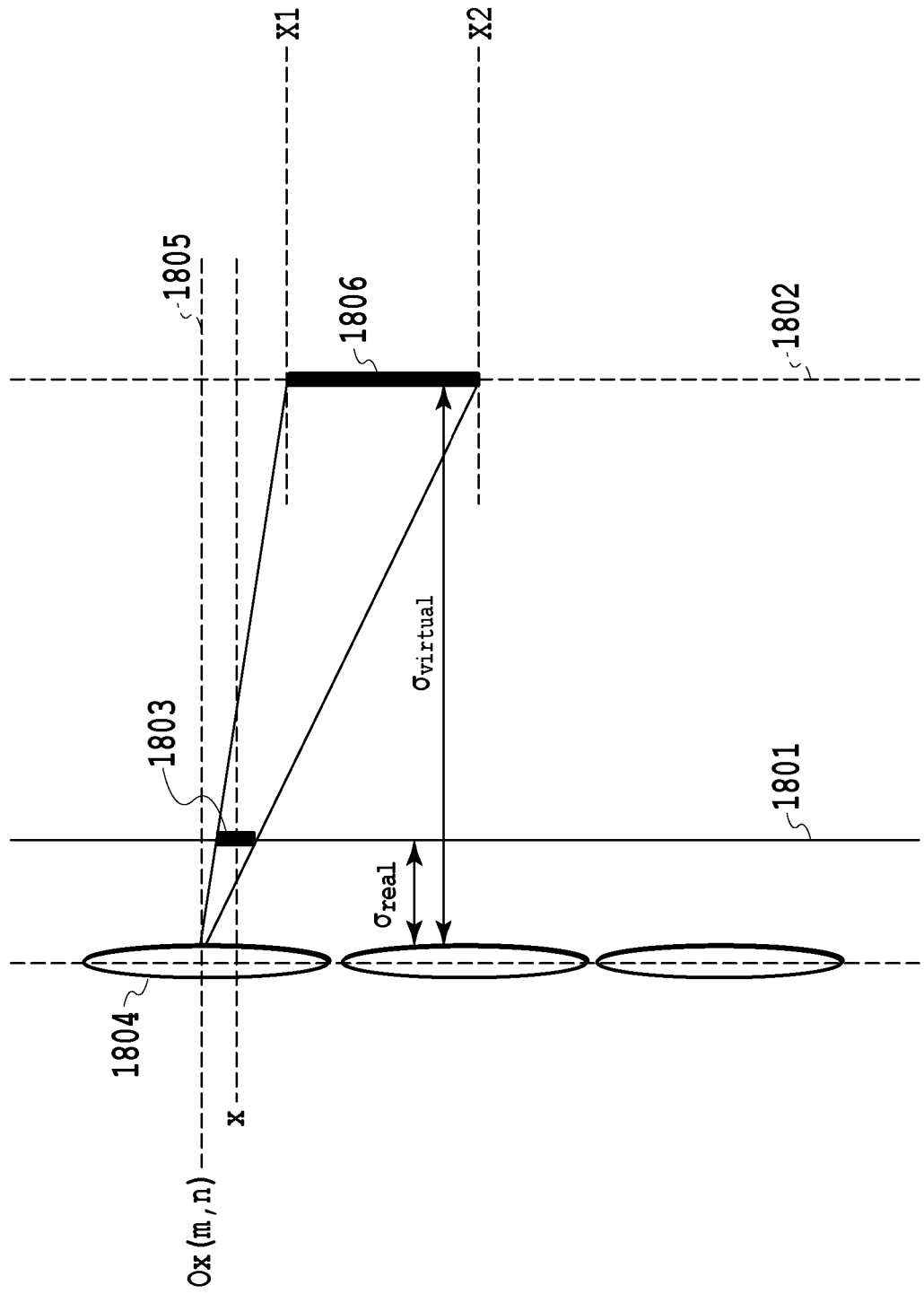
FIG. 18 is a diagram for explaining a method of calculating a pixel position in a combined image.

At step 1702, the pixel position calculating unit 1601 calculates the pixel position in the combined image of a predetermined pixel in the input image data. FIG. 18 is a diagram for explaining the calculation method. Here, it is assumed that the pixel corresponding to a sensor pixel region 1803 on a sensor 1801 is input to the image combining unit 809. In this case, the pixel position calculating unit 1601 calculates a projection region 1806 on a virtual sensor 1802 corresponding to the sensor pixel region 1803 as a result. In FIG. 18, Ox (m, n) represents the position of the optical center of a microlens 1804 and (m, n) represents the coordinate position of the microlens. The position of the input pixel (in FIG. 18, the center of the sensor pixel region 1803) is represented by x. X1 and X2 are positions on the virtual sensor 1802 obtained by calculation and the region between the calculated X1 and X2 is the projection region 1806. In the invention according to the present embodiment, as Ox (m, n), not the design value, but the actual optical center position calculated in the previously described deviation calculation processing is used. That is, as shown in FIG. 18, the projection region 1806, which is the sensor pixel region 1803 projected onto the virtual sensor 1802 with the calculated actual optical center position of the microlens 1804 as a reference, is the position in the combined image of the pixel of the input image data. Then, σ real is the distance between the sensor 1801 and each microlens and σ virtual is the distance between each microlens and the virtual sensor 1802. As is obvious from FIG. 18, the projection region 1806 is enlarged relative to the sensor pixel region 1803 and the enlargement ratio is σ virtual/σ real. Here, σ virtual is set in advance in accordance with an arbitrary focus position specified by a user. For example, a correspondence relationship between an arbitrary focus position and the position of the virtual sensor where the image of the subject in the focus position is formed sharply is obtained in advance by optical simulation and stored in the ROM 103 etc., and thereby, σ virtual is set by the image combining unit 809 appropriately referring to the correspondence relationship. The calculation of the positions of X1 and X2 defining the projection region 1806 is performed in accordance with Formula (12) and Formula (13) below.

$$X1 = Ox(m,n) + (\sigma virtual/\sigma real)(x + s/2 - Ox(m,n)) \quad \text{Formula (12)}$$

$$X2 = Ox(m,n) + (\sigma virtual/\sigma real)(x - s/2 - Ox(m,n)) \quad \text{Formula (13)}$$

In Formula (12) and Formula (13) described above, s stands for the size of the sensor pixel region 1803. Information of the calculated X1 and X2 is sent to the pixel value calculating unit 1603.

In this manner, the pixel position of each pixel of the input image data and the pixel position of the combined image in accordance with an arbitrary focus position are associated with each other in consideration of the actual optical center position of the microlens. Explanation is returned to the flowchart of FIG. 17.

At step 1703, the color deriving unit 1602 derives the color of each pixel of the input image data. The kinds of color include RGB, infrared+RGB, CMY, etc., in accordance with the filter spectral sensitivity of the color filer array. Here, a case of three colors of RGB is considered. The color deriving unit 1602 refers to a table indicating a correspondence between the input pixel position and color and derives the color of the input pixel. For example, in the case that the resolution is six million pixels, the table indicating the correspondence between the input pixel position and color is a table with 2,000 pixels in the vertical direction and 3,000 pixels in the horizontal direction and may be held in the ROM 103 etc. Further, in the case that the relationship between the input pixel position and color is explicit by a mathematical equation, such as in the case that the image capturing unit 100 includes a color filter array of the Bayer array, it may also be possible to obtain the color from the input pixel position by a predetermined arithmetic operation. Information of the derived color is output to the pixel value calculating unit 1603.

At step 1704, the pixel value calculating unit 1603 updates data (intermediate data) within the buffer 1604. Specifically, the pixel value in the input image data corresponding to the calculated pixel position in the combined image and the derived color is stored in the buffer 1604. FIG. 19 shows an example of the intermediate data stored in the buffer 1604. In FIG. 19, in indexes 1901 to 1903, one or a plurality of pixel values is held, respectively. At the present step, the input pixel value is added/stored and the intermediate data is updated in accordance with the pixel position in the combined image received from the pixel position calculating unit 1601 and the information of the color received from the color deriving unit 1602. In the example of FIG. 19, the pixel position in the combined image is expressed by integers, but, X1 and X2 calculated by Formulas (12) and (13) described above are not integers in general. Because of this, it may also be possible to accept non-integral values as numerical values to identify the pixel position in the combined image and to use the fractional part as a weight in calculation of the pixel value of the combined image. For example, a case is considered where a pixel value of 20 is allocated to the coordinates (10, 10.4) indicating the pixel position in the combined image and similarly a pixel value of 10 is allocated to the coordinates (10, 10.1). In this case, to the coordinates (10, 10) indicating the pixel position in the combined image, a pixel value of 12 is allocated by a weighting calculation, such as (0.1*20+0.4*10)/(0.1+0.4), and so on.

At step 1705, the pixel value calculating unit 1603 determines whether update of the intermediate data is completed for a predetermined index, that is, whether the pixel values are thoroughly allocated in any of the indexes. For example, in the case that two pixel values (24 and 26) are stored in the index 1901 (part where the pixel position is coordinates (10, 10) and the color is R) of FIG. 19, it is determined that the update of intermediate data is completed. It is possible to make this determination by calculating in advance, for each index, the number of pixel values that should be stored and by determining whether the number of stored pixel values has reached the number.

Here, the number of pixel values that should be stored for each index is obtained in advance as follows. First, a dummy captured image all the pixel values of which are "1" is provided and then the processing at step 1702 to step 1704 is performed using the dummy image as input image data. Then, after the processing is performed on all the pixels, the number of stored pixel values is counted for each index. In the case that it is determined that the pixel values that should be added are thoroughly allocated in any of the indexes by such determination processing, the procedure proceeds to step 1707. On the other hand, in the case that it is determined that the pixel values are not thoroughly allocated in any of the indexes, the procedure returns to step 1702 and the processing at step 1701 to step 1704 is repeated on the next pixel.

At step 1706, the pixel value combining unit 1605 acquires, from the buffer 1604, the intermediate data (pixel value of the multi-viewpoint image) of the index for which update has been completed, and calculates and outputs an average value thereof as the pixel value of the combined image. For example, in the case where the update of the index 1901 of FIG. 19 has been completed, first, as the number of pixel values used for combination, "2" is acquired and as the pixel values of the multi-viewpoint image used for combination, "24" and "26" are acquired. Then, an average value "25" is calculated which is obtained by dividing the sum "24+26" of the pixel values of the multi-viewpoint image used for combination by the number of pixel values "2" used for combination. Then, the calculated average value "25" is output as the pixel value of the combined image corresponding to the coordinates (10, 10) and the color: R.

At step 1707, the image combining unit 809 determines whether the processing described above has been completed for all the pixels of the input image data. In the case that there is no input pixel which has not been processed yet, the present processing is exited. On the other hand, in the case that there is an input pixel which has not been processed yet, the procedure returns to step 1702 and step 1702 to step 1707 are repeated.

By the above processing, the pixel value of the combined image in an arbitrary focus position is calculated sequentially in consideration of the actual optical center position of each microlens.

Figure 20:
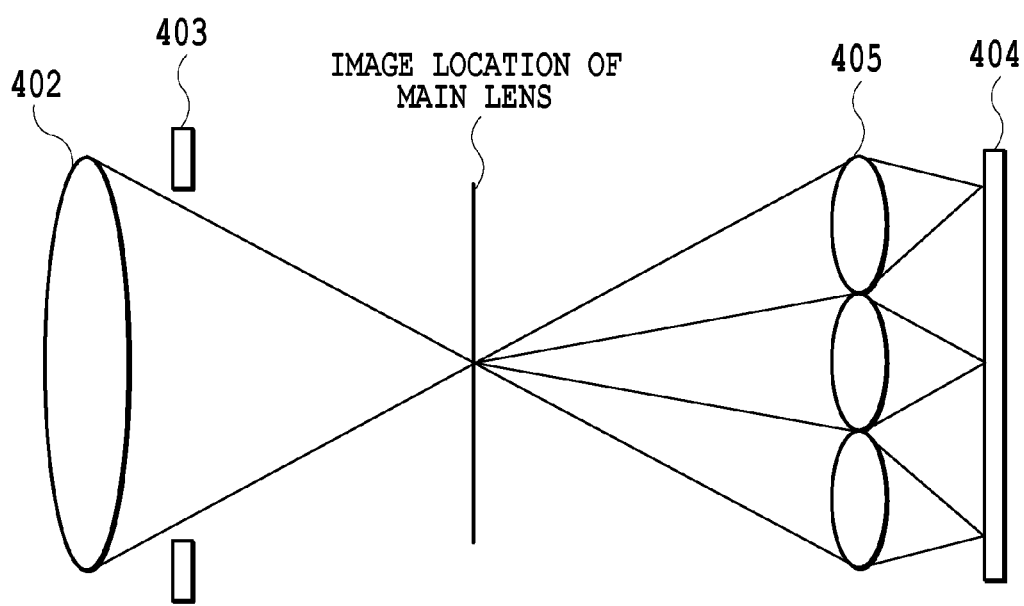
FIG. 20 is a diagram showing an example of a configuration of another image capturing unit that can be applied to the present invention.

In the present embodiment, the microlens array is arranged in the image location of the main lens (see FIGS. 5A and 5B described previously), but, the arrangement position of the microlens array is not limited to the image location of the main lens. For example, as shown in FIG. 20, it may also be possible to arrange the microlens array in the position apart from the image location and near to the sensor so as to observe an aerial image formed in the image location of the main lens. Further, it may also be possible to arrange the microlens array on the side nearer to the main lens than the image location of the main lens, in the manner opposite to that in the example of FIG. 20. In the invention according to the present embodiment, any configuration may be accepted as long as the configuration is one in which the microlens array is arranged between the aperture and the sensor.

As explained above, according to the invention of the present embodiment, it is possible to provide a sharper refocused image because of the refocus processing in consideration of the deviation of the position of each microlens in the microlens array from the design value.

[Second Embodiment]

The first embodiment is an aspect in which the f-stop (F-number) of the main lens selected at the time of calibration of the microlens array is set to a value relatively larger than the f-stop of the main lens at the time of final image capturing (the state where the aperture is stopped down). Next, an aspect is explained as a second embodiment, in which data of an image captured at the time of calibration is analyzed and an appropriate f-stop of the main lens is selected and then calibration of the microlens array is performed. Explanation of parts common to those of the first embodiment is simplified or omitted and here, the different points are explained mainly.

<Configuration Diagram of Image Processing Unit>

Figure 21:
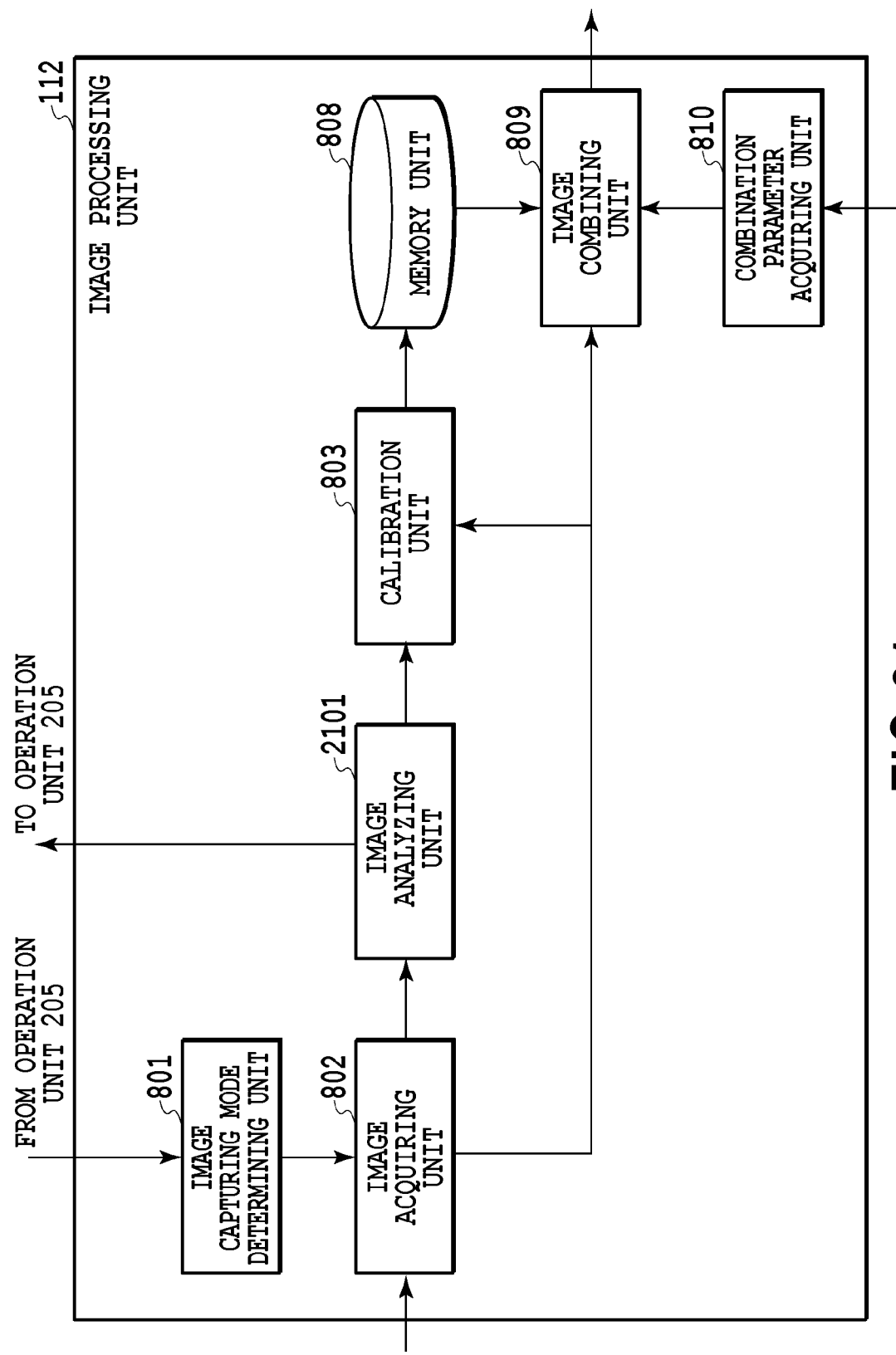
FIG. 21 is a block diagram showing an internal configuration of an image processing unit according to a second embodiment.

FIG. 21 is a block diagram showing an internal configuration of the image processing unit 112 in the present embodiment. An image analyzing unit 2101 is added to the image processing unit 112 of the first embodiment explained in FIG. 8. The image analyzing unit 2101 analyzes data of an image captured for calibration, which is supplied from the image acquiring unit 802, and determines whether or not the f-stop of the main lens is appropriately set. Other processing units are basically the same as those of FIG. 8, and therefore, explanation is omitted.

Figure 22:
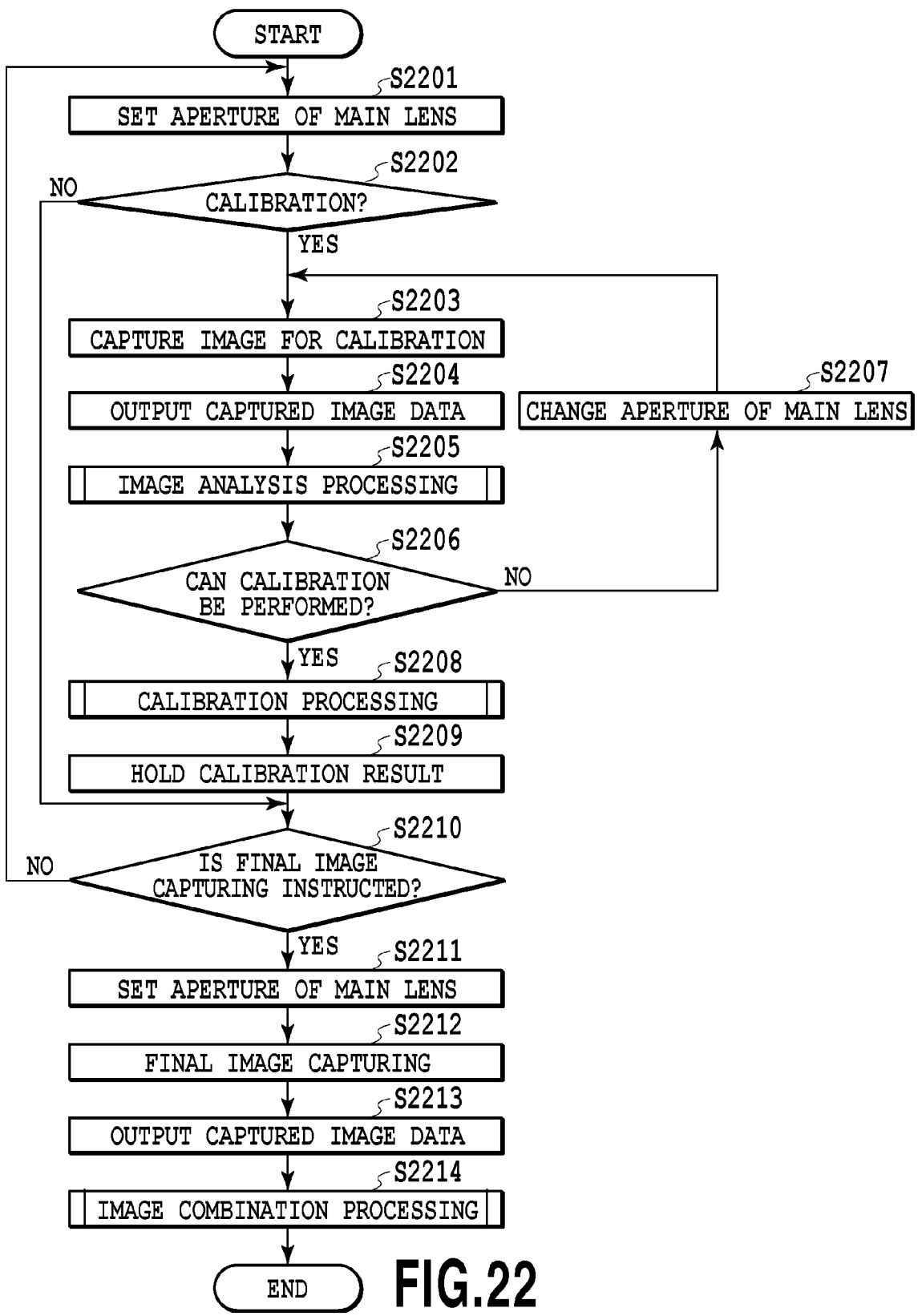
FIG. 22 is a flowchart showing a flow of a series of processing from execution of calibration to output of combined image data in an image capturing device according to the second embodiment.

FIG. 22 is a flowchart showing a flow of a series of processing from execution of calibration to output of combined image data in an arbitrary focus position in the image capturing device according to the present embodiment. As in the flowchart of FIG. 9 of the first embodiment, the series of processing is performed in the case that the CPU 101 reads computer-executable programs in which the procedure shown below is described from the ROM 103 onto the RAM 102, and thereafter executes the programs.

At step 2201, the image capturing unit control unit 108 sets the state where the aperture of the main lens is fully opened. For example, in the case where the F-number is F2.8 in the case that the main lens is fully opened, the aperture is set so as to achieve F2.8.

At step 2202, the image capturing mode determining unit 801 determines whether or not the instruction of the image capturing mode supplied from the operation unit 105 is the instruction of calibration. In the case that the instruction of the image capturing mode is the instruction of calibration, the procedure proceeds to step 2203. On the other hand, at step 2202, in the case that the instruction of the image capturing mode is not the instruction of calibration, the procedure proceeds to step 2209. Steps 2203 and 2204 are the same as steps 903 and 904 of the flowchart of FIG. 9 according to the first embodiment and calibration image data obtained by capturing an image of a subject for calibration is acquired.

At step 2205, the image analyzing unit 2101 analyzes the calibration image data input from the image acquiring unit 802. Details of analysis processing will be described later.

At step 2206, the image analyzing unit 2101 determines whether or not the image of the input image data is an image for which calibration can be performed. In the case that it is determined that the image is one for which calibration can be performed, the procedure proceeds to step 2208. On the other hand, in the case that it is determined that the image is not one for which calibration can be performed, the procedure proceeds to step 2207.

At step 2207, the setting of the aperture of the main lens is changed. Specifically, the aperture of the main lens is stopped down, for example, by one step. If the F-number of the main lens has been set to F2.8 at step 2201, the F-number is changed to a value (for example, F4) larger by one step. In the case that the change of the setting of the aperture of the main lens is completed, the procedure returns to step 2203 and the image of the subject for calibration is captured with the changed f-stop. The above processing is repeated until image data for which calibration can be performed is obtained.

At step 2208, the calibration unit 803 performs calibration processing of the microlens array.

The processing of step 2208 to step 2214 is the same as that of steps 905 to 911 of the flowchart of FIG. 9 according to the first embodiment, and therefore, explanation is omitted. However, in the case that it is determined that the instruction of the image capturing mode is not the instruction of the final image capturing at step 2210, the next step is different from that of the first embodiment. That is, the procedure returns not to the processing to determine whether or not the instruction of the image capturing mode is the instruction of calibration (step 2202), but to the processing to set the state where the aperture of the main lens is fully opened (step 2201) as a result.

At step 2201, the F-number of the main lens is set to F2.8, which is the value in the case that the aperture is fully opened, but, it may also be possible for a user to set an arbitrary F-number. Further, at step 2207, the aperture of the main lens is stopped down by one step, but, it may also be possible to change the aperture by another number of steps (for example, two steps or three steps), or to set a desired f-stop based on the user input via the operation unit 105.

<Explanation of Image Analyzing Unit 2101>

Figure 23:
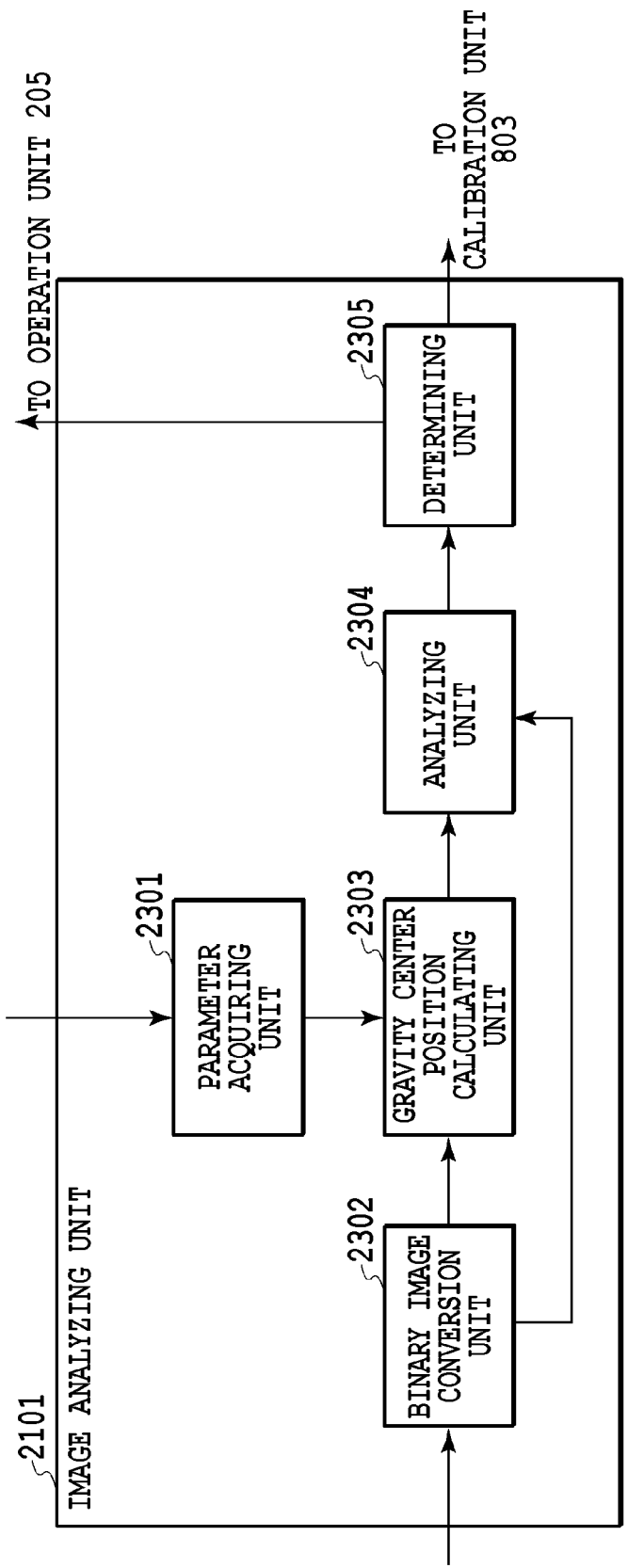
FIG. 23 is a block diagram showing an internal configuration of an image analyzing unit.

FIG. 23 is a block diagram showing an internal configuration of the image analyzing unit 2101.

A parameter acquiring unit 2301 acquires information, such as the number of sensor pixels necessary for image analysis and the numbers of microlenses in the vertical and horizontal directions.

A binary image conversion unit 2302 and a gravity center position calculating unit 2303 are the same as the binary image conversion unit 805 and the gravity center position calculating unit 806 included in the calibration unit 803 of FIG. 8. The image analyzing unit 2101 includes the binary image conversion unit 2302 and the gravity center position calculating unit 2303, and therefore, the binary image conversion unit 805 and the gravity center position calculating unit 806 are no longer necessary in the calibration unit 803 in the present embodiment.

An analyzing unit 2304 analyzes whether or not calibration is appropriate using the binary image data supplied from the binary image conversion unit 2302 and the gravity center position of the image recorded on the sensor via each microlens supplied from the gravity center position calculating unit 2303.

A determining unit 2305 determines whether to perform calibration processing of the microlens array or to recapture an image for calibration after changing the aperture of the main lens based on the analysis result of the analyzing unit 2304.

Figure 24:
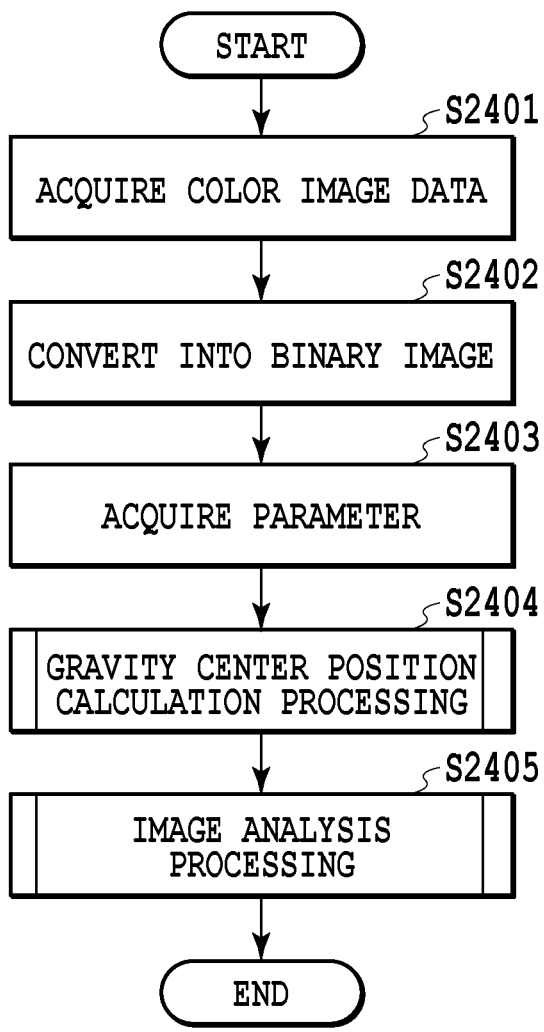
FIG. 24 is a flowchart showing a flow of image analysis processing.

FIG. 24 is a flowchart showing a flow of image analysis processing in the image analyzing unit 2101.

At step 2401, the image analyzing unit 2101 receives calibration image data supplied from the image acquiring unit 802. The calibration image data received here is color image data.

At step 2402, the binary image conversion unit 2302 converts the color image data into the binary image data I (x, y). Here, (x, y) represents the pixel position on the sensor.

At step 2403, the parameter acquiring unit 2301 acquires information of the number of sensor pixels necessary for image analysis and the numbers of microlenses in the vertical and horizontal directions.

At step 2404, the gravity center position calculating unit 2303 calculates the gravity center position of the image recorded on the sensor via each microlens from the binary image data supplied from the binary image conversion unit 2302. The calculation method of the gravity center position is the same as the contents explained in the first embodiment (see the flowchart of FIG. 11), and therefore, explanation is omitted.

Figure 25:
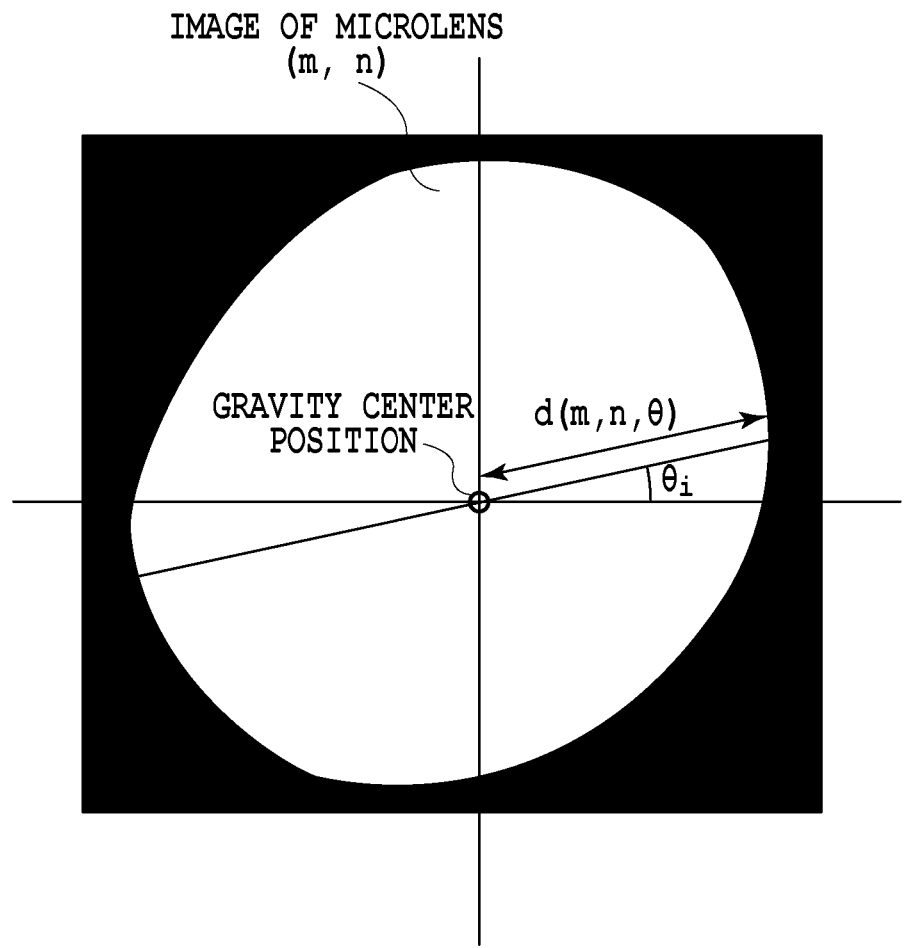
FIG. 25 is a diagram for explaining a concept of a distance between gravity center and boundary.

At step 2405, the analyzing unit 2304 analyzes the image on the sensor via each microlens. Here, a technique is explained, in which a distance (hereinafter, referred to as a "distance between gravity center and boundary") between the gravity center position of the image on the sensor via each microlens and the pixel (boundary pixel) adjacent to the boundary part of the image is obtained and the image is analyzed by a histogram based on the amount of fluctuation of the distance. FIG. 25 is a diagram for explaining the concept of the distance between gravity center and boundary and a process to search for the boundary pixel of the image toward a direction of an angle θi from the gravity center position is shown. Here, d (m, n, θi) is the distance between gravity center and boundary obtained with respect to the angle θi for the microlens (m, n). The symbol i is an index indicating the angle of interest. In the present embodiment, the distance between gravity center and boundary d (m, n, θi) is obtained around the entire circumference of 360° at 15° intervals.

Figure 26:
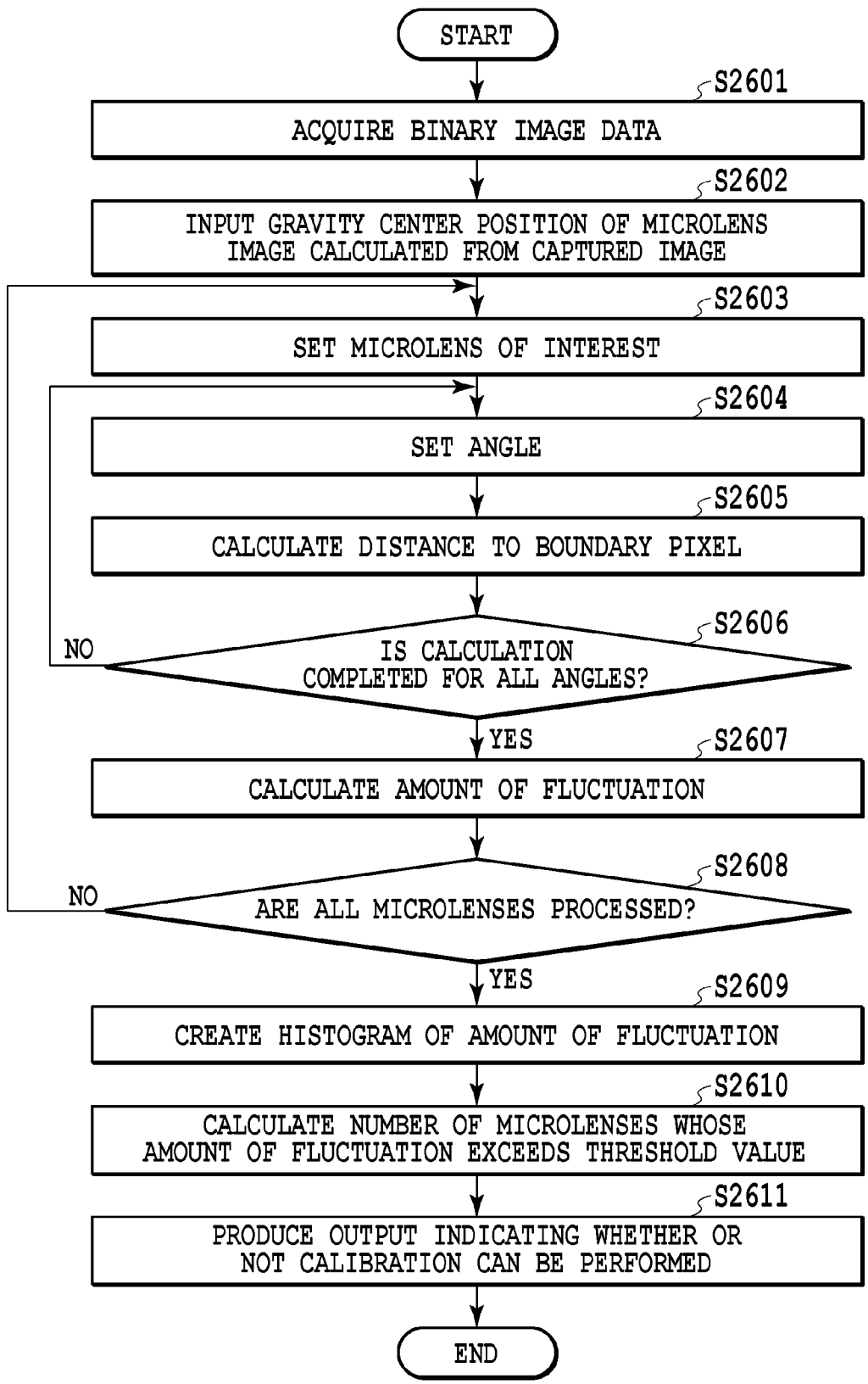
FIG. 26 is a flowchart showing a flow of image analysis processing.

FIG. 26 is a flowchart showing a flow of image analysis processing.

At step 2601, the analyzing unit 2304 receives binary image data supplied from the binary image conversion unit 2302.

At step 2602, the analyzing unit 2304 acquires the gravity center position (Cx (m, n), Cy (m, n)) of the image on the sensor corresponding to each microlens (m, n) calculated by the gravity center position calculating unit 2303.

At step 2603, the analyzing unit 2304 sets a microlens of interest, which is a target of analysis. At the time of start of processing, as initial values, (m, n)=(0, 0) is set.

At step 2604, the analyzing unit 2304 sets the angle θi used for obtaining the distance between gravity center and boundary d (m, n, θi). As described above, the angle θi is set sequentially to $\theta_0=0°$, $\theta_1=15°$, ..., $\theta_{23}=345°$. At the time of start of processing, as an initial value, $\theta_0=0°$ is set.

At step 2605, the analyzing unit 2304 calculates the gravity center position of the image and the distance from the gravity center position to the boundary pixel at the set angle θi. Specifically, from the pixel position corresponding to the gravity center position, the image is scanned toward the direction of the set angle θi to search for a pixel other than the image (here, a pixel whose pixel value is "0"). After that, a pixel (boundary pixel) adjacent to the pixel of the image (here, the pixel whose pixel value is "1") is searched for. In the case that a boundary pixel is found, a distance d_θi between the gravity center position of the image and the boundary pixel that is found is calculated.

At step 2606, the analyzing unit 2304 determines whether or not the calculation of the distance between gravity center and boundary d (m, n, θi) is completed for all the angles θi. In the case that the calculation of the distance between gravity center and boundary is completed for all the angles, the procedure proceeds to step 2507. In the case that there is an angle for which the calculation of the distance between gravity center and boundary is not completed yet, the procedure returns to step 2504 and the processing of steps 2604 to 2606 is repeated until $\theta_{23}=345°$ is reached.

At step 2607, the analyzing unit 2304 calculates an amount of fluctuation of the distance between gravity center and boundary d (m, n, θi) for the microlens (m, n). An amount of fluctuation div (m, n) is calculated using Formula (14) below.

$$div(m,n)=std(d(m,n,\theta i))$$ Formula (14)

Here, std ( ) is a function for calculating the standard deviation.

At step 2608, the analyzing unit 2304 determines whether or not the amount of fluctuation div (m, n) is calculated for all the microlenses. In the case that there is a microlens which has not been processed yet, the procedure returns to step 2603 and the next microlens array of interest is set and then, the processing of step 2604 to step 2608 is repeated until the processing is completed for all the microlenses. On the other hand, in the case that it is determined that the calculation processing of the amount of fluctuation div (m, n) is completed for all the microlenses, the procedure proceeds to step 2609.

Figure 27A:
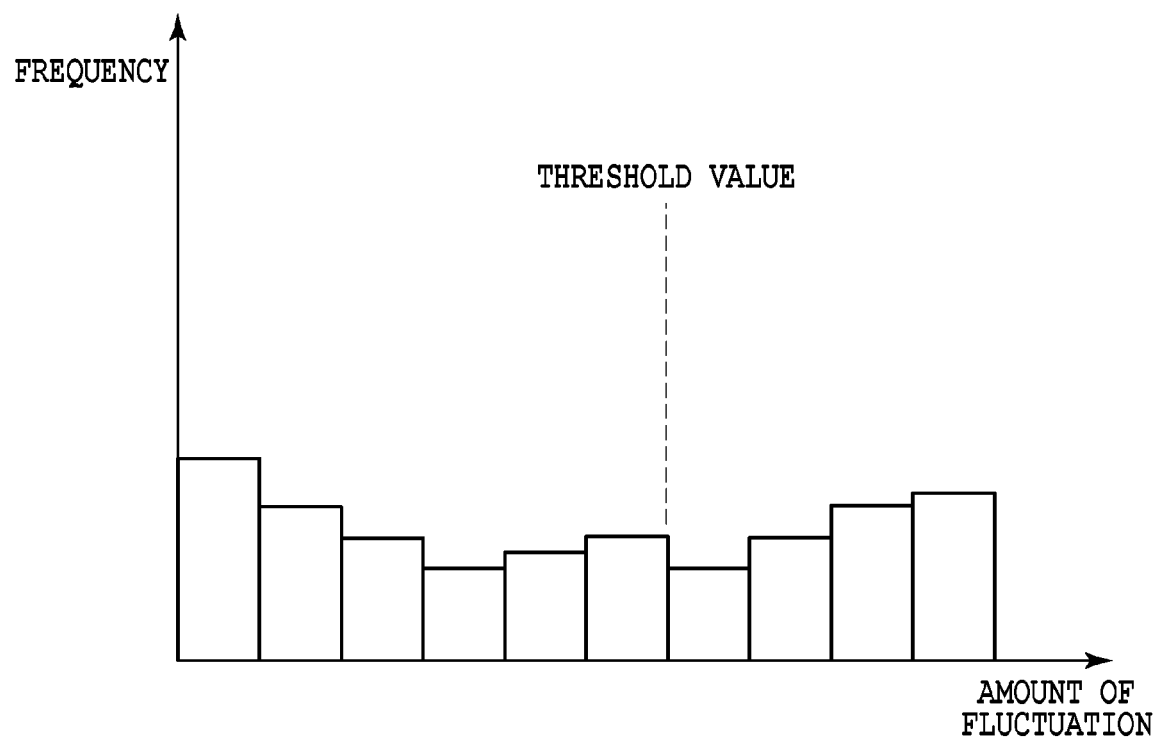
FIG. 27A is a diagram showing a histogram of an amount of fluctuation calculated from data of an image captured in the state where the aperture is fully opened and FIG. 27B is a diagram showing a histogram of an amount of fluctuation calculated from data of an image captured in a state where the aperture is stopped down.
Figure 27B:
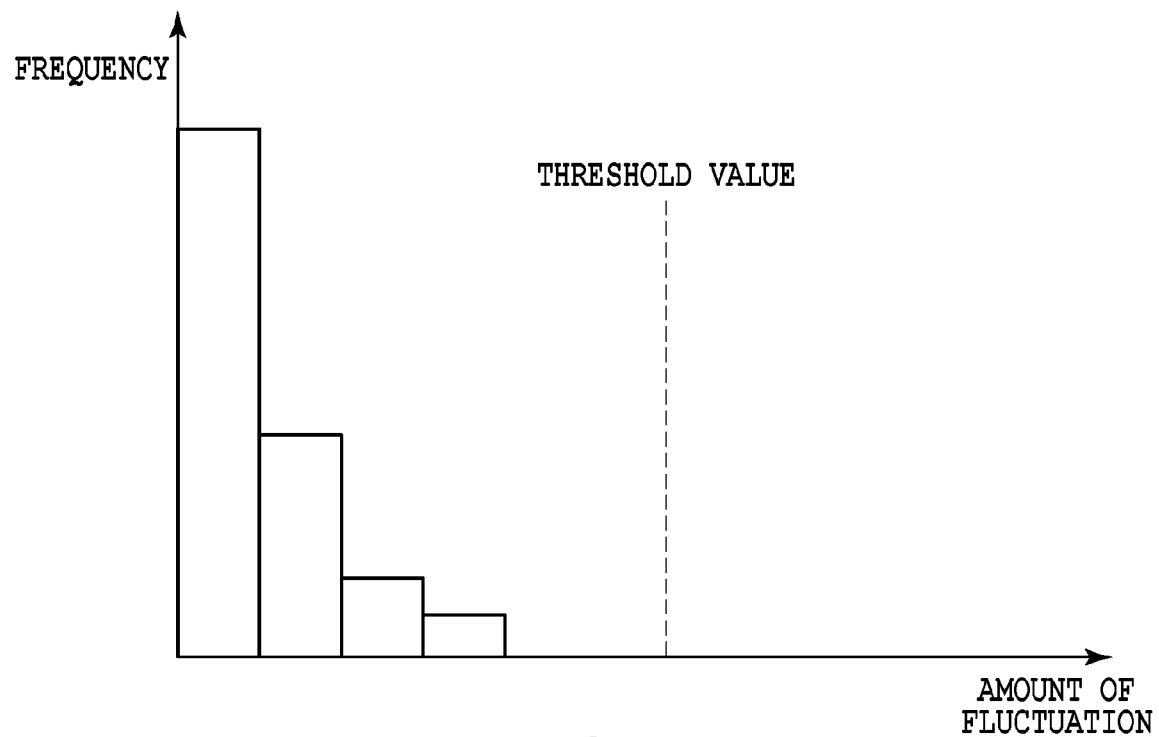

At step 2609, the analyzing unit 2304 creates a histogram of the amount of fluctuation div (m, n). FIG. 27A shows a histogram of the amount of fluctuation div (m, n) calculated from the data of an image captured in the state where the aperture is fully opened and FIG. 27B shows a histogram of the amount of fluctuation div (m, n) calculated from the data of an image captured in the state where the aperture is stopped down (see FIGS. 7A to 7C), respectively. In FIGS. 27A and 27B, the horizontal axis represents the amount of fluctuation and the vertical axis the frequency. In the histogram shown in FIG. 27A, since the spatial unevenness is generated in the shape of the image at the end part of the captured image (see FIGS. 6A to 6C), the frequency of the microlenses indicating a large amount of fluctuation is great because of its influence. In contrast to this, in the histogram shown in FIG. 27B, since there are no microlenses in the spatially uneven shape (see FIGS. 7A to 7C), the frequency of the microlenses indicating a large amount of fluctuation does not appear.

At step 2610, the analyzing unit 2304 refers to the histogram and calculates the number of microlenses whose amount of fluctuation div (m, n) exceeds a threshold value set in advance. It is known that while in the histogram shown in FIG. 27A, a plurality of microlenses whose amount of fluctuation exceeds the threshold value appears, in the histogram shown in FIG. 27B, no microlens whose amount of fluctuation exceeds the threshold value appears.

At step 2611, the analyzing unit 2304 produces an output indicating whether or not calibration can be performed. For example, the analyzing unit 2304 outputs an analysis result to the determining unit 2305, such as that calibration can be performed in the case that the number of microlenses calculated at step 2610 is "0" or that calibration cannot be performed in the case that the calculated number is "1" or larger.

In the present embodiment, after creating the histogram of the amount of fluctuation div (m, n), it is determined whether or not calibration can be performed by comparison with the threshold value set in advance. However, it may also be possible to determine whether or not calibration can be performed by another method, for example, by focusing attention on another index, such as the maximum value and average value of the amount of fluctuation div (m, n).

In the present embodiment, in the case that analyzing the image of the microlens at step 2405, attention is focused on the standard deviation of the distance between gravity center and boundary, but, another analyzing method may be used. For example, it may also be possible to perform an analysis by obtaining a rectangle that circumscribes the image on the sensor via each microlens and focusing attention on the aspect ratio of the circumscribing rectangle. It is also possible to adopt another analyzing method using an index with which it is possible to grasp the fluctuation in the spatial shape of the image on the sensor via each microlens in the microlens array.

As explained above, according to the invention of the present embodiment, it is made possible to perform more accurate calibration by analyzing calibration image data acquired for calibration of the microlens array and determining whether or not the data is suitable for calibration.

[Third Embodiment]

The second embodiment is an aspect in which data of an image captured for calibration of the microlens array is analyzed and calibration is performed after selecting an appropriate f-stop (F-number) of the main lens. Next, an aspect is explained as a third embodiment, in which data of an image captured for calibration is analyzed and in the case that the data of the captured image is not suitable for calibration, warning to that effect is given to a user. Explanation of parts common to those of the second embodiment is simplified or omitted and here different points are explained mainly.

The internal configuration of the image processing unit 112 in the third embodiment is basically the same as the internal configuration of the image processing unit 112 shown in FIG. 21 according to the second embodiment. Although not shown schematically, the different point is that the analysis result of the image analyzing unit 2101 is sent also to the display control unit 107 in addition to the operation unit 205 and the calibration unit 803.

Figure 28:
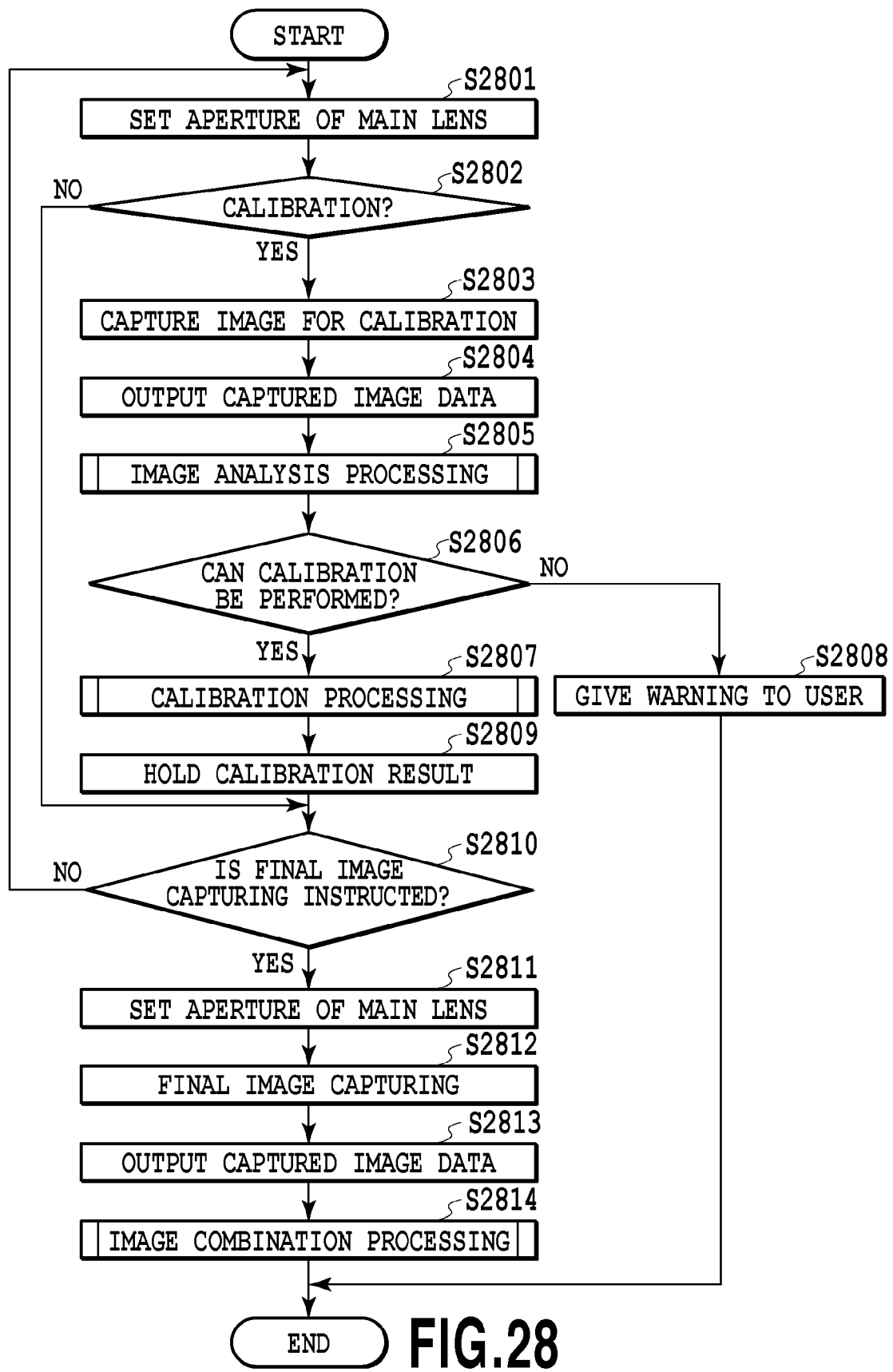
FIG. 28 is a flowchart showing a flow of a series of processing from execution of calibration to output of combined image data in an arbitrary focus position in an image capturing device according to a third embodiment.

FIG. 28 is a flowchart showing a flow of a series of processing from execution of calibration to output of combined image data in an arbitrary focus position in the image capturing device according to the present embodiment.

Steps 2801 to 2806 are the same as steps 2201 to 2206 in the flowchart of FIG. 22, and therefore, explanation is omitted.

In the case that the image analyzing unit 2101 determines that the input image data is not suitable for calibration at step 2806, the procedure proceeds to step 2808. On the other hand, in the case that determining that the input image data is suitable for calibration, the image analyzing unit 2101 performs processing in each of step 2807 to 2814. The step 2807 to step 2814 are the same as steps 2208 to 2214 in the flowchart of FIG. 22, and therefore, explanation is omitted.

At step 2808, the display control unit 107 displays, on the display unit 106, a message (not shown schematically) etc. indicating that the data of the image captured for calibration is not suitable for calibration to give a warning to a user. In the case that warning is given to the user, the present processing is exited. The user having received the warning, for example, changes the setting of the f-stop of the main lens and then issues the instruction of calibration again.

As explained above, according to the invention of the present embodiment, the image data acquired for calibration of the microlens array is analyzed and in the case that the image data is not suitable for calibration, warning is given to a user. Due to this, it is made possible to suppress a failure in calibration and a reduction in calibration precision.

Other Embodiments

Aspects of the present invention can also be realized by a computer of a system or apparatus (or devices such as a CPU or MPU) that reads out and executes a program recorded on a memory device to perform the functions of the previously described embodiment(s), and by a method, the steps of which are performed by a computer of a system or apparatus by, for example, reading out and executing a program recorded on a memory device to perform the functions of the previously described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-045627, filed Mar. 1, 2012, which is hereby incorporated by reference herein in its entirety.

What is claimed is:

1. An image processing device comprising:
an image data acquiring unit configured to acquire calibration image data obtained by an image capturing device including an aperture stop to adjust an amount of incident light, a lens array in which a plurality of lenses is arranged, and an image sensing element to photoelectrically convert an image of a subject via the lens array, wherein the calibration image data includes images of the subject via the lens array and each of the images corresponds to one of the plurality of lenses;
a determining unit configured to determine whether or not the calibration image data is suitable for calibration of the lens array based on a shape of at least one of the images of the subject via the lens array included in the calibration image data; and
a position acquiring unit configured to acquire, in a case where the image data is suitable for the calibration, by using the image data, positions of areas in the image sensing element where images of the subject via the lens array are formed.

2. The image processing device according to claim 1, further comprising a deviation calculating unit configured to calculate a deviation of the positions of the areas from a design value on the sensing element corresponding to each of the lenses based on the calibration image data.

3. The image processing device according to claim 1, wherein the position acquiring unit acquires gravity center positions of the areas as the positions of the areas.

4. The image processing device according to claim 2, wherein the deviation calculating unit calculates an actual optical center position of each of the lenses based on the calculated deviation.

5. The image processing device according to claim 2, further comprising an image combining unit configured to generate combined image data in an arbitrary focus position based on the deviation or an actual optical center position calculated by the deviation calculating unit using image data obtained in a state where the aperture stop is opened more widely than in a state where the calibration image data is obtained.

6. The image processing device according to claim 3, wherein the determining unit obtains distances between a gravity center position of an area in the image sensing element where an image of the subject via one of the lenses is formed and positions of boundary pixels adjacent to boundary parts of the area and determines whether or not the calibration image data is suitable for the calibration based on an amount of fluctuation between the obtained distances.

7. The image processing device according to claim 1 further comprising a unit configured to change the state of the aperture into a state where the aperture further stopped down in a case where the calibration image data is not suitable for the calibration.

8. The image processing device according to claim 1, wherein, in a case where the calibration image data is not suitable for the calibration, a warning is given to a user.

9. An image processing method, the image processing method comprising the steps of:
acquiring calibration image data obtained by an image capturing device including an aperture stop to adjust an amount of incident light, a lens array in which a plurality of lenses is arranged, and an image sensing element arranged to photoelectrically convert an image of a subject via the lens array, wherein the calibration image data includes images of the subject via the lens array and each of the images corresponds to one of the plurality of lenses;
determining whether or not the calibration an image data is suitable for calibration of the lens array based on a shape of at least one of the images of the subject via the lens array included in the calibration image data; and acquiring, in a case where the image data is suitable for the calibration, by using the image data, positions of areas in the image sensing element where images of the subject via the lens array are formed.

10. A non-transitory computer readable storage medium storing an executable program for causing a computer to perform the image processing method according to claim 9.

11. The image processing device according to claim 1, wherein the determining unit determines that the calibration image data is not suitable for the calibration in a case where the shapes of the images of the subject via the lens array included in the image data are deformed from shapes expected from a shape of the aperture more greatly than a predetermined extent.

12. The image processing device according to claim 1, wherein the calibration image data is obtained with the aperture in a state where the aperture is stopped down and the image capturing device has a larger F-number than in a state where the aperture is fully opened.

13. The image processing device according to claim 12, wherein the calibration image data is obtained with the aperture in a state where the aperture is stopped down in accordance with an instruction to calibrate the lens array.

* * * * *